US012698362B2

(12) United States Patent
Zelisko et al.

(10) Patent No.: US 12,698,362 B2
(45) Date of Patent: Aug. 4, 2026

(54) SELF-HEALING SILOXANE ELASTOMERS

(71) Applicant: BROCK UNIVERSITY, St. Catharines (CA)

(72) Inventors: Paul M. Zelisko, Stoney Creek (CA); Paria Azadi Namin, Guelph (CA)

(73) Assignee: BROCK UNIVERSITY, St. Catharines (CA)

( * ) Notice: Subject to any disclaimer, the term of this patent is extended or adjusted under 35 U.S.C. 154(b) by 1007 days.

(21) Appl. No.: 17/840,113

(22) Filed: Jun. 14, 2022

(65) Prior Publication Data

US 2023/0002560 A1 Jan. 5, 2023

Related U.S. Application Data

(60) Provisional application No. 63/213,348, filed on Jun. 22, 2021.

(51) Int. Cl.
*C08G 77/06* (2006.01)
*C08K 5/5419* (2006.01)

(52) U.S. Cl.
CPC ............ *C08G 77/06* (2013.01); *C08K 5/5419* (2013.01)

(58) Field of Classification Search
CPC .... C08G 77/06; C08K 5/5419; C08K 5/5477; C08K 5/3415; Y02W 30/62; C08L 83/04
See application file for complete search history.

(56) References Cited

U.S. PATENT DOCUMENTS 6,271,335 B1 * 8/2001 Small ..................... C08G 61/12 528/332
10,919,241 B2 2/2021 Zelisko et al.
2019/0315934 A1 * 10/2019 Zelisko ................. B29C 73/163

FOREIGN PATENT DOCUMENTS

WO WO2014/130948 A1 8/2014

OTHER PUBLICATIONS

D. K. Schneiderman and M. A. Hillmyer, Macromolecules, 2017, 50, 3733-3749.
J. Hopewell, R. Dvorak and E. Kosior, Philosophical Transactions of the Royal Society B: Biological Sciences, 2009, 364, 2115-2126.
I. L. Hia, V. Vahedi and P. Pasbakhsh, Polymer Reviews, 2016, 56, 225-261.
P. A. Pratama, M. Sharifi, A. M. Peterson and G. R. Palmese, ACS Applied Materials and Interfaces, 2013, 5, 12425-12431.
R. a Gross and B. Kalra, Science, 2002, 297, 803-807.
R. Dhanasekaran, S. Sreenatha Reddy and A. Sai Kumar, Materials Today: Proceedings, 2018, 5, 21373-21377.
Y. Hong and M. Su, ACS Applied Materials and Interfaces, 2012, 4, 3759-3764.
Y. Zhang, A. A. Broekhuis and F. Picchioni, Macromolecules, 2009, 42, 1906-1912.
S. D. Bergman and F. Wudl, Journal of Materials Chemistry, 2008, 18, 41-62.

(Continued)

*Primary Examiner* — Doris L Lee
(74) *Attorney, Agent, or Firm* — Smart & Biggar LP; Patricia Folkins

(57) ABSTRACT

The present disclosure relates to self-healing siloxane elastomers. In particular, the present disclosure relates to self-healing siloxane elastomers comprising at least one siloxane polymer reversibly crosslinked to a second siloxane oligomer or polymer, the reversible cross-linked may be formed at ambient temperature.

18 Claims, 6 Drawing Sheets

(56) References Cited

OTHER PUBLICATIONS

G. Scheltjens, M. M. Diaz, J. Brancart, G. Van Assche and B. Van Mele, Reactive and Functional Polymers, 2013, 73, 413-420.
D. Y. Wu, S. Meure and D. Solomon, Progress in Polymer Science, 2008, 33, 479-522.
R. P. Wool, Soft Matter, 2008, 4, 400-418.
Q. Shen, H. Liu, Y. Peng, J. Zheng and J. Wu, Polymer Chemistry, 2021, 12, 494-500.
Y. Zhang, E. Ren, A. Li, C. Cui, R. Guo, H. Tang, H. Xiao, M. Zhou, W. Qin, X. Wang and L. Liu, Journal of Materials Chemistry B, 2021, 9, 719-730.
S. Efstathiou, A. M. Wemyss, G. Patias, L. Al-Shok, M. Grypioti, D. Coursari, C. Ma, C. J. Atkins, A. Shegiwal, C. Wan and D. M. Haddleton, Journal of Materials Chemistry B, 2021, 9, 809-823.
X. Lei, Y. Huang, S. Liang, X. Zhao and L. Liu, Materials Letters, 2020, 268, 1-4.
H. Yan, S. Dai, Y. Chen, J. Ding and N. Yuan, ChemistrySelect, 2019, 4, 10719-10725.
D. P. Wang, Z. H. Zhao, C. H. Li and J. L. Zuo, Materials Chemistry Frontiers, 2019, 3, 1411-1421.
E. Ogliani, L. Yu, I. Javakhishvili and A. L. Skov, RSC Advances, 2018, 8, 8285-8291.
A. Strąkowska, A. Kosmalska, M. Masłowski, T. Szmechtyk, K. Strzelec and M. Zaborski, Polymer Bulletin, 2019, 76, 3387-3402.
R. Bui and M. A. Brook, Polymer, 2019, 160, 282-290.
P. Zheng and T. J. McCarthy, Journal of the American Chemical Society, 2012, 134, 2024-2027.
L. Zhao, X. Shi, Y. Yin, B. Jiang and Y. Huang, Composites Science and Technology, 2020, 186, 1-8.
J. Zhao, R. Xu, G. Luo, J. Wu and H. Xia, Journal of Materials Chemistry B, 2016, 4, 982-989.
S. Zheng, Y. Chen and M. A. Brook, Polymer Chemistry, 2020, 11, 7382-7392.
Z. Gou, Y. Zuo and S. Feng, RSC Advances, 2016, 6, 73140-73147.
A. Nasresfahani and P. M. Zelisko, Polymer Chemistry, 2017, 8, 2942-2952.
Sandra Schafer Guido Kickelbick, Polymer, 2015, 69, 357-368.
R. Gheneim, C. Perez-Berumen and A. Gandini, Macromolecules, 2002, 35, 7246-7253.
H. Lei, S. Wang, D. J. Liaw, Y. Cheng, X. Yang, J. Tan, X. Chen, J. Gu and Y. Zhang, ACS Macro Letters, 2019, 8, 582-587.
L. M. Polgar, M. Van Duin, A. A. Broekhuis and F. Picchioni, Macromolecules, 2015, 48, 7096-7105.
D. Yu, X. Zhao, C. Zhou, C. Zhang and S. Zhao, Macromolecular Chemistry and Physics, 2017, 218, 1-6.

* cited by examiner

SELF-HEALING SILOXANE ELASTOMERS

CROSS-REFERENCE TO RELATED APPLICATIONS

The present application claims the benefit of priority from U.S. Provisional Patent Application Ser. No. 63/213,348 filed on Jun. 22, 2021, the contents of which are incorporated herein by reference in their entirety.

TECHNICAL FIELD

The present disclosure relates to self-healing siloxane elastomers. In particular, the present disclosure relates to self-healing siloxane elastomers comprising at least one siloxane polymer reversibly crosslinked to a siloxane crosslinker.

BACKGROUND

At the beginning of $19^{th}$ century, the production of rubber and then plastic materials grew rapidly. The relatively low cost of manufacturing these materials resulted in the production of commodities that were effectively disposable in nature. However, the disposable nature of these materials, and their reliance on non-renewable resources, has had a profound impact on our environment. Some researchers predict that by 2050, 20% of the oil consumed annually would be going to the plastics industry. The marine conservation society in 2008 found that over 50% of the litter is plastic, consisting of 7,393 plastic bags, 7,025 pieces of plastic trays and cups and 16,243 plastic drinks bottles which is 77% more than plastic waste identified in 1994. The exact environmental impact of plastics is difficult to assess. In regards with the applications of plastics and their properties, environmentalists' priority is to recycle and reuse these materials after their service life, which is both economically and environmentally advantageous because it takes two-third less energy to use recycled plastics at the first step of material production other than using virgin plastics. However, pollution by polymers is a growing concern, especially because of the disposable nature of many of the plastics being utilized around the world.

One of the strategies for addressing the growing plastics pollution problem is the development of methodologies for prolonging lifetimes of polymers through self-healing strategies including silicone polymers.

Self-healing polymers are a class of smart materials capable of responding to a specific stimulus, commonly thermal and mechanical energies, to heal damaged areas through a chemical reaction or physical interaction. Polymeric materials are susceptible to damage over the course of their lifetime. As a result, engineered materials have been developed with the aim of damage suppression/management in order to extend the lifetime and reliability of synthetic materials. Cross-linking is often employed as a means of enhancing the physical and mechanical properties of polymers. Compared to thermoplastics, which are not chemically cross-linked, thermoset materials can have higher durability, extended lifetimes, greater solvent resistance, and dimensional stability.

Although a number of approaches have been utilized in the development of self-healing polymers, including Schiff bases, Diels-Alder reactions, hydrogen bonding interactions, the self-healing process typically requires significant time and/or the application of an external stimulus (e.g., heat). As such, there is a need to develop self-healing and recyclable polymer that would be healed without the input of external thermally energy, optimally at ambient temperature, and that would be able to be easily recycled.

SUMMARY

The present disclosure relates to self-healing siloxane elastomers. In particular, the present disclosure relates to self-healing siloxane elastomers comprising at least one siloxane polymer reversibly crosslinked to a crosslinker.

Accordingly, in one embodiment of the disclosure there is included a siloxane elastomer, comprising:

a) at least one siloxane polymer which is functionalized with at least one first Diels-Alder moiety, wherein the first Diels-Alder moiety comprises a diene; and b) a crosslinker having maleimide moieties and having the structure

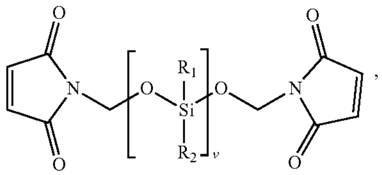

wherein $R_1$ and $R_2$ are independently or simultaneously —($C_1$-$C_{10}$)-alkyl, —($C_2$-$C_{10}$)-alkenyl, —($C_2$-$C_{10}$)-alkynyl, or —($C_6$-$C_{10}$)-aryl;

v is an integer from 1 to 10; and wherein the first Diels-Alder moiety and the maleimide moieties form reversible crosslinks to form the siloxane elastomer.

The siloxane elastomers of the present disclosure are capable of healing damaged areas through the reversible cross-links between the siloxane polymers without external stimuli, such as thermal and mechanical energies, for example at a temperature of about 20° C. to about 30° C.

Other features and advantages of the present application will become apparent from the following detailed description. It should be understood, however, that the detailed description and the specific examples while indicating preferred embodiments of the application are given by way of illustration only, since various changes and modifications within the spirit and scope of the application will become apparent to those skilled in the art from this detailed description.

BRIEF DESCRIPTION OF THE DRAWINGS

The present disclosure will now be described in greater detail with reference to the drawings in which.

DESCRIPTION OF VARIOUS EMBODIMENTS

Definitions

Figure 1:
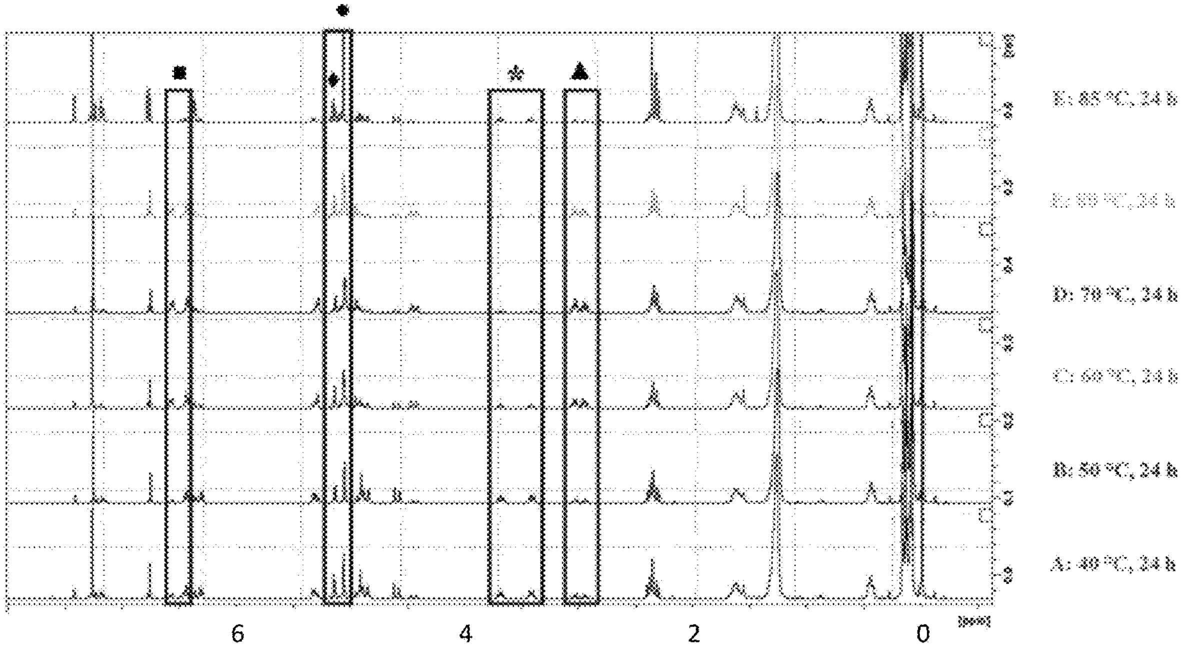
FIG. 1 shows $^1H$ NMR spectra of the reaction between 5 and 10 at different temperatures (40° C., 50° C., 60° C., 70° C., 80° C., 85° C.) illustrating maleimide consumption (●) and the formation of the new endocyclic double bond (■), the formation of the new endocyclic double bond (■), the bridgehead proton (t), and the exo (▲) and endo (*) adduct products, according to exemplary embodiments of the application.

The term "siloxane elastomer" as used herein refers to a siloxane polymer exhibiting elastic properties.

The term "siloxane polymer" as used herein refers to an organo-silicon polymer which comprises Si—O—Si linkages as the backbone of the polymer.

The term "functionalized" as used herein refers to a modification to generate or introduce a new reactive or more reactive group that is capable of undergoing reaction with another molecule.

The term "Diels Alder moiety" as used herein refers to a chemical moiety which can participate in a Diels-Alder [2+4] cycloaddition.

The term "maleimide" as used herein refers to groups with a 2,5-pyrroledione moiety.

The term "dienophile" as used herein refers to a moiety that possesses 2 π-electrons, and which can participate in Diels-Alder cycloaddition reactions. Examples include, but are not limited to, alkenes, alkynes, nitriles, enol ethers, and en-amines.

The term "diene" as used herein refers to a moiety containing two, or at least two, conjugated double bonds, which participate in Diels-Alder cycloaddition reactions.

The term "reversible cross-links" as used herein refers to covalent bonds which form between the first and second siloxane polymers, in which, for example, the covalent bonds are reversible and can subsequently form new cross-links (cross-linked covalent bonds).

The term "oligomer" as used herein, and as understood in the art, comprises a few monomer units, e.g. less than 100, or in contrast to a polymer that, at least in principle, consists of an unlimited number of monomers. Dimers, trimers and tetramers are oligomers, and may be referred to as one-two or three-mers of monomer.

The term "aryl" as used herein means a monocyclic, bicyclic or tricyclic aromatic ring system containing, depending on the number of atoms in the rings, for example from 6 to 10 carbon atoms, and at least 1 aromatic ring and includes phenyl, naphthyl, 1,2-dihydronaphthyl, 1,2,3,4-tetrahydronaphthyl, indanyl, indenyl and the like.

The term "($C_1$-$C_p$)-alkyl" as used herein means straight and/or branched chain, saturated alkyl radicals containing from one to "p" carbon atoms and includes (depending on the identity of p) methyl, ethyl, propyl, isopropyl, n-butyl, s-butyl, isobutyl, t-butyl, 2,2-dimethylbutyl, n-pentyl, 2-methylpentyl, 3-methylpentyl, 4-methylpentyl, n-hexyl and the like, where the variable p is an integer representing the largest number of carbon atoms in the alkyl radical.

The term "($C_2$-$C_p$)alkenyl" as used herein means straight or branched chain, unsaturated alkyl groups containing from two to p carbon atoms and one to three double bonds, and includes (depending on the identity of p) vinyl, allyl, 2-methylprop-1-enyl, but-1-enyl, but-2-enyl, but-3-enyl, 2-methylbut-1-enyl, 2-methylpent-1-enyl, 4-methylpent-1-enyl, 4-methylpent-2-enyl, 2-methylpent-2-enyl, 4-methylpenta-1,3-dienyl, hexen-1-yl and the like, where the variable p is an integer representing the largest number of carbon atoms in the alkenyl radical.

The term "($C_2$-$C_p$)alkynyl" as used herein means straight and/or branched chain, unsaturated alkyl groups containing from one to n carbon atoms and one or more, suitably one to three, triple bonds, and includes (depending on the identity of p) ethynyl, 1-propynyl, 2-propynyl, 2-methylprop-1-ynyl, 1-butynyl, 2-butynyl, 3-butynyl, 1,3-butadiynyl, 3-methylbut-1-ynyl, 4-methylbut-ynyl, 4-methylbut-2-ynyl, 2-methylbut-1-ynyl, 1-pentynyl, 2-pentynyl, 3-pentynyl, 4-pentynyl, 1,3-pentadiynyl, 1,4-pentadiynyl, 3-methylpent-1-ynyl, 4-methylpent-2-ynyl4-methylpent-2-ynyl, 1-hexynyl and the like, where the variable n is an integer representing the largest number of carbon atoms in the alkynyl group.

Siloxane Elastomers

The present disclosure relates to self-healing siloxane elastomers. In particular, the present disclosure relates to self-healing siloxane elastomers comprising at least one siloxane polymer reversibly crosslinked to a crosslinker having maleimide moieties. It has been surprisingly shown herein that the polymers and crosslinkers of the present application provide for elastomers capable of self-healing without external stimuli, and capable of being recycled. Comparable polymers and crosslinkers did not display the same properties, highlighting the surprising results obtained with the elastomers of the application Accordingly, in one embodiment of the disclosure there is included a siloxane elastomer, comprising a) at least one siloxane polymer which is functionalized with at least one first Diels-Alder moiety, wherein the first Diels-Alder moiety comprises a diene; and b) a crosslinker having maleimide moieties and having the structure

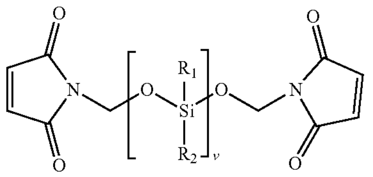
, wherein $R_1$ and $R_2$ are independently or simultaneously —$(C_1\text{-}C_{10})$-alkyl, —$(C_2\text{-}C_{10})$-alkenyl, —$(C_2\text{-}C_{10})$-alkynyl, or —$(C_6\text{-}C_{10})$-aryl;

v is an integer from 1 to 10; and wherein the first Diels-Alder moiety and the maleimide moieties form reversible crosslinks to form the siloxane elastomer.

In one embodiment, the at least one siloxane polymer is a siloxane having the structure of formula (I)

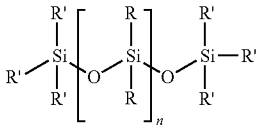

(I)

wherein each R is independently or simultaneously —$(C_1\text{-}C_{10})$-alkyl, —$(C_2\text{-}C_{10})$-alkenyl, —$(C_2\text{-}C_{10})$-alkynyl, or —$(C_6\text{-}C_{10})$-aryl;

each R' is a suitable terminal group, and n is an integer between 1 and 1,000, and wherein a portion of the R groups are replaced with a group comprising the first Diels-Alder moiety.

In some embodiments, n is an integer from 10 to 1,000, or 50 to 500, or 100 to 500, or 100 to 250.

In another embodiment, each R is independently or simultaneously is —$(C_1\text{-}C_6)$-alkyl, —$(C_2\text{-}C_6)$-alkenyl, —$(C_2\text{-}C_6)$-alkynyl, or phenyl.

In another embodiment, R' is OH or —$(C_1\text{-}C_6)$-alkyl, or $CH_3$.

In another embodiment, the first Diels-Alder moiety is a reactive diene. In another embodiment, the reactive diene is an acyclic diene, a cyclic diene, or a heterocyclic diene. In another embodiment, the reactive diene is a furan moiety. In another embodiment, the furan moiety has the structure

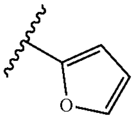

.

In another embodiment, the furan moiety is

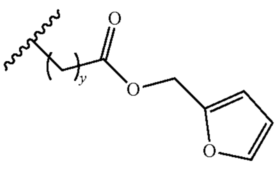

, wherein y is an integer between 1 and 10, and

represents the connection to the siloxane.

In another embodiment, the furan moiety is

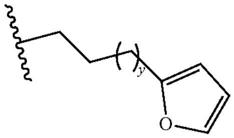

wherein y is an integer between 1 and 10, and

represents the connection to the siloxane.

In some embodiments, the at least one siloxane polymer has the structure:

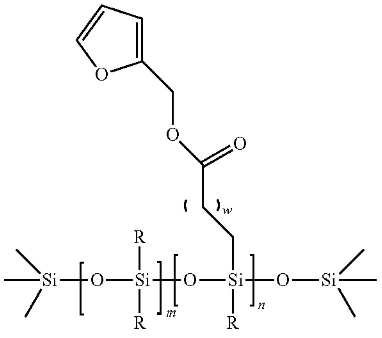

wherein w is an integer between 1 and 10, such as 8;

m represents the molar ratio of the monomer and is between about 0.1 to about 20.0 mol %; and n represents the molar ratio of the monomer and is between about 80.0 to about 99.9 mol %, and R is as previously defined, for example $CH_3$.

In another embodiment, the siloxane has the structure

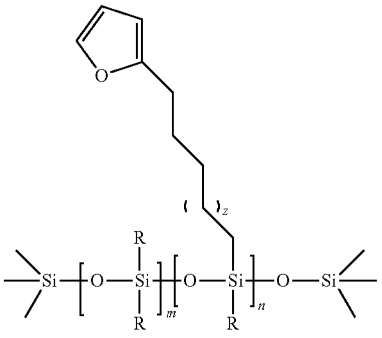

wherein z is an integer between 1 and 10, such as 7;

m represents the molar ratio of the monomer and is between about 0.1 to about 20.0 mol %; and n represents the molar ratio of the monomer and is between about 80.0 to about 99.9 mol %, and R is as previously defined, for example $CH_3$.

In other embodiments, m is 0.5 to about 10.0 mol %, or about 1.0 to about 10.0 mol %. In other embodiments, n is 85.0 to about 99.9 mol %, or about 90.0 to about 99.9 mol %.

In one embodiment, the at least one siloxane polymer is a polydimethylsiloxane. In another embodiment, the at least one siloxane polymer is a polydimethylsiloxane functionalized with at least one first Diels-Alder moiety.

In one embodiment, the crosslinker having maleimide moieties has the structure

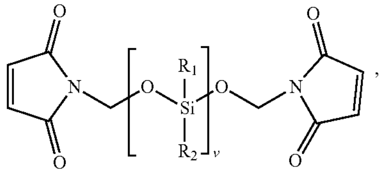

wherein $R_1$ and $R_2$ are independently or simultaneously —$(C_1$-$C_6)$-alkyl, such as methyl, ethyl or propyl, and v is an integer from 1 to 3.

In one embodiment, $R_1$ and $R_2$ are methyl and v is 1.

In some embodiments, the crosslinker is

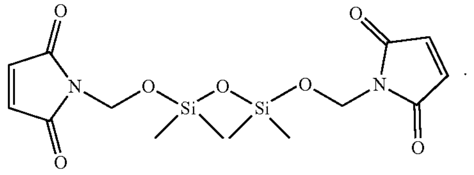

In further embodiments, the at least one siloxane polymer, which is functionalized with the first Diels-Alder moiety, is crosslinked to the crosslinker having maleimide moieties, through a reversible Diels-Alder [2+4] cycloaddition. In another embodiment, when the first Diels-Alder moiety is a furan moiety and the dienophile is a maleimide moiety, the reversible cross-link has the structure

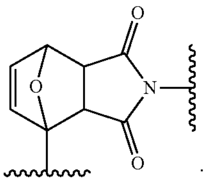 [SMILES: *N1C(=O)C2C3C=CC(*)(O3)C2C1=O]

In further embodiments, the at least one siloxane polymer is a trimethylsilyl terminated copolymer comprising monomeric units of:

a first monomer which is a dimethylsiloxane;

a second monomer, which is formed from a methylhydrosiloxane, wherein the methylhydrosiloxane is functionalized with the first Diels-Alder moiety.

In another embodiment, the dimethylsiloxane has the structure

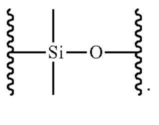

In a further embodiment, the methylhydrosiloxane has the structure

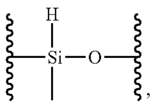 [SMILES: *O[SiH](*)C]

which is converted to a monomer having the structure

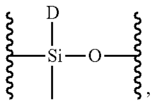

wherein D is a moiety containing the first Diels-Alder moiety, wherein D is

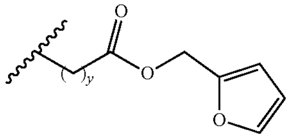

or

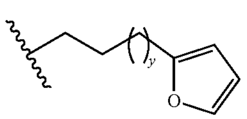

wherein y is an integer between 1 and 10, and

represents the connection to the siloxane.

In further embodiments of the disclosure, the at least one siloxane polymer and the crosslinker are able to form the reversible crosslinking bonds without external stimuli, for example at ambient temperature. In some embodiments, the at least one siloxane polymer and the crosslinker are able to form the reversible crosslinking bonds at a temperature of about 20° C. to about 30° C. In some embodiments, the at least one siloxane polymer and the crosslinker are able to form the reversible crosslinking bonds at a temperature of about 25° C.

In another embodiment, the present disclosure also includes a siloxane elastomer in which the dienophile is present on the siloxane polymer. Accordingly, in one embodiment, the disclosure includes a siloxane elastomer, comprising a) at least one siloxane polymer which is functionalized with at least one first Diels-Alder moiety, wherein the first Diels-Alder moiety comprises a dienophile; and b) a crosslinker having diene moieties and having the structure

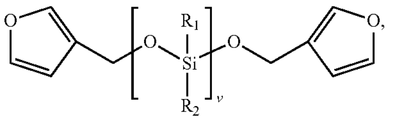

wherein $R_1$ and $R_2$ are independently or simultaneously —$(C_1$-$C_{10})$-alkyl, —$(C_2$-$C_{10})$-alkenyl, —$(C_2$-$C_{10})$-alkynyl, or —$(C_6$-$C_{10})$-aryl;

v is an integer from 1 to 10; and wherein the first Diels-Alder moiety and the diene moieties form reversible crosslinks to form the siloxane elastomer.

In one embodiment, the at least one siloxane polymer is a siloxane having the structure of formula (II)

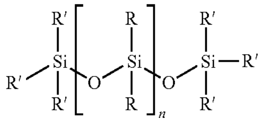

(II)

wherein each R is independently or simultaneously —($C_1$-$C_{10}$)-alkyl, —($C_2$-$C_{10}$)-alkenyl, —($C_2$-$C_{10}$)-alkynyl, or —($C_6$-$C_{10}$)-aryl;

each R' is a suitable terminal group, and n is an integer between 1 and 1,000, and wherein a portion of the R groups are replaced with a group comprising the first Diels-Alder moiety which is a dienophile.

In some embodiments, n is an integer from 10 to 1,000. In some embodiments, n is an integer from 10 to 1,000, or 50 to 500, or 100 to 500, or 100 to 250.

In another embodiment, each R is independently or simultaneously is —($C_1$-$C_6$)-alkyl, —($C_2$-$C_6$)-alkenyl, —($C_2$-$C_6$)-alkynyl, or phenyl.

In another embodiment, R' is OH or —($C_1$-$C_6$)-alkyl, or $CH_3$.

In another embodiment, the siloxane polymer of Formula (II) comprises a dienophile. In another embodiment, the dienophile is bonded to an electron withdrawing group. In a further embodiment, the dienophile is a maleimide moiety. In a further embodiment, the maleimide moiety has the structure

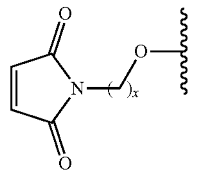

wherein x is an integer between 1 and 10 and

represents the connection to the siloxane polymer.

In some embodiments, the siloxane polymer of the Formula (II) has the structure

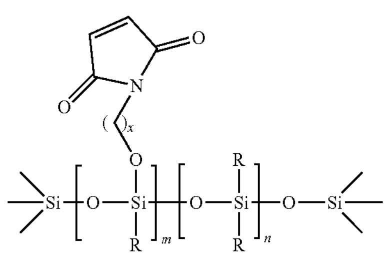

wherein x is an integer between 1 and 10;

m represents the molar ratio of the monomer and is between about 0.1 to about 20.0 mol %; and n represents the molar ratio of the monomer and is between about 80.0 to about 99.9 mol %, and R is as previously defined.

In other embodiments, m is 0.5 to about 10.0 mol %, or about 1.0 to about 10.0 mol %. In other embodiments, n is 85.0 to about 99.9 mol %, or about 90.0 to about 99.9 mol %.

In one embodiment, the crosslinker having diene moieties has the structure

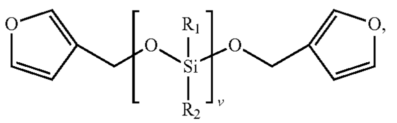

wherein $R_1$ and $R_2$ are independently or simultaneously —($C_1$-$C_6$)-alkyl, such as methyl, ethyl or propyl, and v is an integer from 1 to 3.

In one embodiment, $R_1$ and $R_2$ are methyl and v is 1.

In some embodiments, the crosslinker is

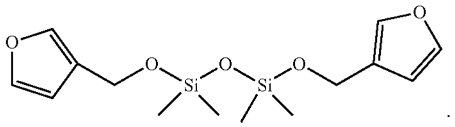 [SMILES: C[Si](C)(OCc1ccoc1)O[Si](C)(C)OCc1ccoc1]

In further embodiments, the crosslinked polymers are able to undergo a retro-Diels-Alder reaction to be recycled, for example by responding to an external stimuli, such as thermal and mechanical energies, to break the reversible cross-links between the siloxane polymer and the crosslinker and transiently form the at least one siloxane polymer which is functionalized with a first Diels-Alder moiety and the crosslinker which is functionalized with a maleimide moiety, allowing recycling of the same. In one embodiment, the cross-linked polymers are heated to a temperature of less than about 100° C., or less than about 90° C. to break the reversible cross-links. In some embodiments, the retro-Diels-Alder temperature is from 40° C. to 90° C., or from 50° C. to 85° C., or from 60° C. to 80° C.

In some embodiments, the elastomers of the present disclosure are useful as coatings, sealants, and elastomer systems where elastomers are useful (O-rings etc.).

Although the disclosure has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present disclosure.

The operation of the disclosure is illustrated by the following representative examples. As is apparent to those skilled in the art, many of the details of the examples may be changed while still practicing the disclosure described herein

EXAMPLES

Materials

Toluene, tetrahydrofuran (THF), diethyl ether, n-butyl lithium, furan, 11-bromoundec-1-ene, N,N'-(1,3-phenylene) dimaleimide, silica gel (230-400 mesh), molecular sieves (4 Å beads, 8-12 mesh), 10-undecenoic acid, furfuryl alcohol, Pt(0)-1,3-divinyl-1,1,3,3-tetramethyldisiloxane complex (Karstedt's catalyst, Pt(dvs)) in xylenes, lipase B from *C. antarctica* immobilized on Lewatit™ VPOC1600 cross-linked divinylbenzene resin (Novozym-435, N435), trimethylsilyl terminated-poly(dimethylsiloxane-co-methylhydrosiloxane) (3-4% methylhydrosiloxane) with an average $M_n$ of 13,000 g/mol (19a), trimethylsilyl terminated-poly (dimethylsiloxane-co-methylhydrosiloxane) (7-9% methylhydrosiloxane) with an approximate molecular weight of 5,500-6,500 g/mol (19b) and trimethylsilyl terminated-poly (dimethylsiloxane-co-methylhydrosiloxane) (25-30% methylhydrosiloxane) with an approximate molecular weight of 2,000-2,600 g/mol (19c) were obtained from Sigma-Aldrich (Oakville, Ontario, Canada). Heptamethyltrisiloxane Trimethylsilyl terminated-poly(dimethylsiloxane-co-methylhydrosiloxane) (4-6% methylhydrosiloxane) with an average MW of 20,000-25,000 g/mol (19d), trimethylsilyl terminated-poly(dimethylsiloxane-co-methylhydrosiloxane) (4-8% methylhydrosiloxane) with an average MW of 50,000-60,000 g/mol (19e), trimethylsilyl terminated-poly (dimethylsiloxane-co-methylhydrosiloxane) (6-7% methylhydrosiloxane) with an average MW of 1,900-2,000 g/mol (19f), trimethylsilyl terminated-poly(dimethylsiloxane-co-methylhydrosiloxane) (15-18% methylhydrosiloxane) with an average MW of 1,900-2,000 g/mol (19g), and trimethylsilyl terminated-poly(dimethylsiloxane-co-methylhydrosiloxane) (50-55% methylhydrosiloxane) with an average MW of 900-1,200 g/mol (19h) were obtained from Gelest (Morristown, PA, USA). All compounds were used as received unless otherwise stated.

Instrumentation

Mass Spectrometry (MS). Electron Impact (EI) and Fast Atom Bombardment (FAB) mass spectrometry were carried out on a Thermo DFS high resolution mass spectrometer in positive ion mode.

Nuclear Magnetic Resonance (NMR) Spectroscopy. $^1H$, $^{13}C$, and $^{29}Si$ variable temperature (VT) and solid-state NMR were carried out using a Brucker AV-300 digital NMR spectrometer with a 7.05 Tesla Ultrashield™ magnet equipped with a BBFO Z-gradient ATMA probe head.

Thermogravimetric analysis (TGA) and Differential Scanning Calorimetry (DSC). The thermal analyses were conducted using a Perkin-Elmer STA 8000 instrument which has a temperature range from 30° C. to 1600° C. Octadecane was used for calibration (27.95° C. melting point) while aluminum was used as the standard.

Scanning Electron Microscopy (SEM). Samples were mounted onto SEM stubs with double-sided carbon tape and then placed into the chamber of a Polaron Model E5100 sputter coater (Polaron Equipment Ltd., Watford, Hertfordshire) and approximately 15 nm of gold was deposited onto the stubs. The samples were viewed in a Tescan Vega II LSU scanning electron microscope (Tescan USA, PA) operating at 10 kV.

Infrared Spectroscopy (IR). Attenuated Total Reflectance Fourier Transform IR (ATR FT-IR) spectra were acquired on a Bruker Alpha Optic GmbH 2012. All spectra were an average of 24 scans at 2 $cm^{-1}$ resolution using neat samples on a diamond window.

Tensile Strength Measurements. A MARK-10 single-column force tensiometer consisting of: a M5-200 force gauge, ESM303 compression test stand, G1101 vise-action grip was used to analyze the tensile strength of the elastomer samples.

Durometer Test. A digital durometer (Check-Line® OS-1E) was used to measure Shore 00 hardness.

Example 1—Synthesis of Model Compounds

All the reactions were performed under nitrogen atmosphere. Molecular sieves were kept in the oven at least five days prior to being used.

Synthesis of the Diene

Two different diene systems were synthesized in order to make a library of elastomers and to compare their properties.

Synthesis of furan-2-ylmethylundec-10-enoate (3)

Furfuryl alcohol 1 (1.96 g, 20 mmol) was added to a solution of 10-undecenoic acid 2 (1.85 g, 10 mmol) in toluene (15 mL). Afterwards, the enzymatic catalyst N435 (4% w/w, 0.15 g) was introduced to the flask followed by the addition of molecular sieves (approximately 1 g). The reaction mixture was heated to 110° C. and stirred for 48 h. The reaction mixture was filtered through a medium porosity fritted Büchner funnel containing a 2 cm Celite® pad and the solvent was removed using a rotary evaporator. The crude product was dissolved in diethyl ether and washed with distilled water and then extracted with a saturated solution of sodium bicarbonate and brine (×3 each). The organic layer was dried over anhydrous sodium sulfate and the light yellow oil was purified using silica gel column chromatography using 9:1 hexane:ethyl acetate as the elution solvent to yield 3 as a colorless liquid (28.7 g, 0.11 mol, 83%).

$^1H$ NMR (300 MHz, $CDCl_3$) δ 7.42 (dd, J=0.63, 0.57 Hz, 1H), δ 6.35-6.40 (m, 2H), δ 5.74-5.90 (m, 1H), δ 5.74 (s, 2H), δ 4.90-5.02 (m, 2H), δ 2.32 (t, J=7.4 Hz, 2H), δ 2.03 (q, J=6.8 Hz, 2H), δ 1.60-1.64 (m, 2H), δ 1.27 (s, 10H). $^{13}C$ {$^1H$} NMR (101 MHz, $CDCl_3$) δ 173.45, 149.66, 143.18, 139.18, 114.13, 110.52, 110.45, 57.86, 34.14, 29.25, 29.03, 28.90, 24.85 ppm.

Synthesis of furanyl-2-methyl-11-(1,1,1,3,5,5,5-heptamethyltrisiloxan-3-yl)undecanoate (5)

After dissolving 3 (2.64 g, 10 mmol) in toluene (10 mL) and heating the reaction to 85° C. in a 100 mL round bottom flask equipped with a condenser, 1,1,1,3,5,5,5-heptamethyltrisiloxane 4 (2.50 g, 11.2 mmol) was introduced to the flask and stirred for 10 min followed by the addition of Karstedt's catalyst (25 μL). The reaction mixture was stirred over night until $^1H$ NMR confirmed that there was no longer a Si—H resonance in the spectrum. After completion of the reaction, activated carbon was added to the mixture at ambient temperature and stirred for 2 h. The reaction was then vacuum filtered through a pad of Celite® using a Büchner funnel to yield 5 (4.13 g, 9.1 mmol, 81%) as a light yellow oil. Spectral analyses were consistent with published data.

$^1H$ NMR (300 MHz, $CDCl_3$) δ 7.42 (s, 1H), δ 6.35-6.39 (m, 2H), δ 5.05 (s, 2H), δ 2.32 (t, J=7.5 Hz, 2H), δ 1.61 (t, J=7.2 Hz, 2H), δ 1.26 (s, 14H), δ 0.44 (t, J=7.5 Hz, 2H), δ 0.08 (s, 18H), δ −0.01 (s, 3H). 13C {1H} NMR (101 MHz, $CDCl_3$) δ 173.47, 143.17, 110.52, 110.44, 57.84, 34.16, 33.22, 29.49, 29.46, 29.33, 29.23, 29.09, 24.88, 23.06, 17.62, 1.85, −0.27 ppm. $^{29}$Si {$^{1}$H} NMR (60 MHz, $CDCl_3$) δ 6.76 ppm.

Synthesis of 2-(undec-10-en-1-yl)furan (8)

THF was dried over molecular sieves 5 days before being used. Furan was distilled over KOH and under nitrogen immediately before use. THF (80 mL) was cooled in an ice bath prior the addition of n-butyllithium (20 mL, 48 mmol, 2.5 M solution in pentane). The freshly distilled furan (3.4 mL, 50 mmol) was added dropwise to the reaction flask and allowed to stir for 30 min at 0° C. 11-Bromoundec-1-ene (9.32 g, 40 mmol) was introduced to the reaction mixture slowly at ambient temperature and the reaction was allowed to stir over night. The reaction mixture was quenched with a saturated aqueous solution of $NH_4Cl$ (40 mL) and then extracted with ethyl acetate (3×40 mL). After drying the organic phase with $MgSO_4$ and removing the solvent using a rotary evaporator, compound 8 was obtained from column chromatography using n-hexane (7.5 g, 34.1 mmol, 85%) as the elution solvent as a clear and colorless liquid.

$^{1}$H NMR (300 MHz, $CDCl_3$) δ 7.29 (d, J=1.2 Hz, 1H), δ 6.27 (dd, J=2.0, 1.9 Hz, 1H), δ 5.98 (t, J=2.8 Hz, 1H), δ 5.75-5.90 (m, 1H), δ 4.91-5.03 (m, 2H), δ 2.62 (t, J=7.5 Hz, 2H), δ 2.05 (q, J=6.7 Hz, 2H), δ 1.60-1.69 (m, 2H), δ 1.30 (s, 12H). $^{13}$C {$^{1}$H} NMR (101 MHz, $CDCl_3$) δ 156.63, 140.60, 139.24, 114.09, 110.01, 104.49, 33.81, 29.48, 29.45, 29.33, 29.17, 29.12, 28.93, 28.03, 27.98 ppm.

Synthesis of 3-(11-(furan-2-yl)undecyl)-1,1,1,3,5,5,5-heptamethyltrisiloxane (9)

After dissolving 8 (2.64 g, 10 mmol) in toluene (10 mL) and heating the solution to 85° C. in a 100 mL round bottom flask equipped with a condenser, 1,1,1,3,5,5,5-heptamethyltrisiloxane 4 (2.5 g, 11.2 mmol) was added to the solution and stirred for 10 min prior to the addition of Karstedt's catalyst (25 μL). The reaction mixture was stirred over night until $^{1}$H NMR confirmed that no Si—H resonances remained in the spectrum. After the hydrosilylation was completed, activated carbon was added to the mixture at ambient temperature and stirred for 2 h and the mixture was subsequently vacuum filtered through a pad of Celite® using a Büchner funnel to yield compound 9 (4.25 g, 9.6 mmol, 80%) as a pale yellow liquid.

1H NMR (300 MHz, $CDCl_3$) δ 7.28 (d, J=1.2 Hz, 1H), δ 6.35-6.39 (dd, 2H), δ 5.05 (s, 2H), δ 2.32 (t, J=7.5 Hz, 2H), δ 1.61 (t, J=7.2 Hz, 2H), δ 1.26 (s, 14H), δ 0.44 (t, J=7.5 Hz, 2H), δ 0.08 (s, 18H), δ −0.01 (s, 3H). $^{13}$C {$^{1}$H} NMR (101 MHz, $CDCl_3$) δ 156.65, 140.59, 110.00, 104.48, 33.23, 29.65, 29.58, 29.37, 29.19, 29.04, 27.98, 23.06, 17.62, 1.85, −0.27 ppm. $^{29}$Si {$^{1}$H} NMR (60 MHz, $CDCl_3$) δ 6.76 ppm.

Synthesis of N-hydroxymethylmaleimide (17)

Compound 17 was synthesized from a suspension of maleimide (24.5 g, 0.25 mol) in 37% formalin (20.3 ml, 0.72 mol) to which 0.75 mL of a 5% sodium hydroxide solution was added over 10 min at 30° C. The reaction was allowed to stir for 3 h at 30° C. After filtration, the crude product was recrystallized from ethyl acetate to obtain 17 (24 g, 0.19 mol, 76%).

$^{1}$H NMR (300 MHz, $CDCl_3$) δ 6.77 (s, 2H), δ 5.08 (d, J=7.8, 2H), δ 2.95 (t, J=7.9 Hz, 1H). $^{13}$C {$^{1}$H} NMR (101 MHz, $CDCl_3$) δ 170.07, 134.63, 61.13 ppm.

Synthesis of tetramethylbis[(N-maleimidomethyl)oxy]disiloxane (10)

Compound 17 (25.5 g, 0.2 mol) was dissolved in dry THF (50 mL), followed by the addition of triethylamine (27.9 mL, 0.2 mol) and 1,3-dichloro-1,1,3,3-tetramethyldisiloxane (20.3 g, 0.1 mol). The reaction mixture stirred at ambient temperature for 4 h under a nitrogen atmosphere. The crude mixture was filtered through a sintered glass Büchner funnel and the filtered inorganic salts were washed with diethylether. After removing the solvent, diethylether (40 mL) was added to the reaction mixture and it was washed with distilled water (3×20 mL), dried over sodium sulfate, filtered, and concentrated using a rotary evaporator to yield compound 10 as a white, shiny powder (29 g, 0.075 mol, 76.3%).

$^{1}$H NMR (300 MHz, $CDCl_3$) δ 6.75 (s, 4H), δ 5.14 (s, 4H), δ 0.16 (s, 12H). 13C {1H} NMR (101 MHz, $CDCl_3$) δ 169.82, 134.56, 60.01, −1.11 ppm. $^{29}$Si {$^{1}$H} NMR (60 MHz, $CDCl_3$) δ −10.08 ppm. High-Res MS-FAB+ $[C_{14}H_{20}N_2O_7Si_2+NH_4]+$: 402 amu, $[C_{14}H_{20}N_2O_7Si_2+Na]+$: 407 amu, $[C_{14}H_{20}N_2O_7Si_2+K]+$: 423 amu. Elemental Analysis (%). Calculated: C: 43.73, H: 5.24. Found: C: 43.59, H: 5.16.

Model Diels-Alder Reactions

All of the 12 model Diels-Alder reactions were set up at one of the following temperatures, five various temperatures 40° C., 50° C., 60° C., 70° C. and 80° C., in an effort to optimize the reaction temperature and maleimide conversion. The reactions were performed neat in 2-dram vials with a 1:1 mole ratio of diene:dienophile. The reactions were stirred 24 h to yield the DA adduct.

Synthesis of the Elastomers

Synthesis of furan-2-ylmethylundecanoatesiloxane-dimethylsiloxane copolymers (20a-h)

Trimethylsilyl-terminated poly(dimethylsiloxane-co-methylhydrosiloxane) (19a-h) was dissolved separately in toluene (80 mL) before the addition of Karstedt's catalyst (180 μL). After 10 min of stirring, compound was added to the flask under reflux and stirred overnight. Activated charcoal was added to the reaction after it was cooled to ambient temperature and stirring continued for an additional 5 h. The reaction was filtered through a pad of Celite® using Büchner funnel to yield polymer after removal of the solvent. Sample spectral data:

$^{1}$H NMR (20a) (300 MHz, $CDCl_3$) δ=7.40 (d, 1.9 Hz, 1H), 6.38-6.34 (m, 2H), 5.04 (s, 2H), 2.33-2.28 (m, 2H), 1.63-1.58 (m, 2H), 1.24 (m, 14H), 0.50-0.45 (m, 2H), 0.06 (s, 167H). 13C {1H} NMR (101 MHz, $CDCl_3$) δ=173.38, 149.69, 143.15, 110.51, 110.43, 57.83, 34.15, 33.34, 29.49, 29.39, 29.26, 29.10, 24.88, 22.97, 17.49, 1.77, 1.51, 0.52, −0.50. $^{29}$Si {$^{1}$H} NMR (60 MHz, $CDCl_3$) δ=−21.95. IR: v=1743 $cm^{-1}$ (C═O), 1258 $cm^{-1}$ (C—O).

$^{1}$H NMR (20b) (300 MHz, $CDCl_3$) δ=7.40 (d, 1.9 Hz, 1H), 6.39-6.35 (m, 2H), 5.05 (s, 2H), 2.33-2.28 (m, 2H), 1.63-1.58 (m, 2H), 1.24 (m, 14H), 0.51-0.46 (m, 2H), 0.06 (s, 77H). $^{13}$C {$^{1}$H} NMR (101 MHz, $CDCl_3$) δ=173.38, 149.69, 143.13, 110.50, 110.41, 57.81, 34.13, 33.32, 29.49, 29.38, 29.25, 29.09, 24.88, 22.96, 17.49, 1.75, 1.51, 0.52, −0.50. $^{29}$Si {$^{1}$H} NMR (60 MHz, $CDCl_3$) δ=7.20, −21.97. IR: v=1742 $cm^{-1}$ (C═O), 1258 $cm^{-1}$ (C—O).

$^1$H NMR (20c) (300 MHz, $CDCl_3$) δ=7.41 (s, 1H), 6.39-6.35 (m, 2H), 5.05 (s, 2H), 2.34-2.29 (t, J=7.5 Hz, 2H), 1.64-1.59 (t, J=7.0 Hz, 2H), 1.25 (m, 14H), 0.52-0.47 (m, 2H), 0.07 (s, 19H). $^{13}$C {$^1$H} NMR (101 MHz, $CDCl_3$) δ=173.36, 149.73, 143.13, 110.50, 110.41, 57.82, 34.11, 33.32, 29.49, 29.38, 29.25, 29.11, 24.88, 22.96, 17.49, 1.51, 0.52, −0.50. $^{29}$Si {$^1$H} NMR (60 MHz, $CDCl_3$) δ=−21.94. IR: v=1742 $cm^{-1}$ (C═O), 1258 $cm^{-1}$ (C—O).

Synthesis of furan-2-ylmethylundecanoatesiloxane-dimethylsiloxane copolymers (21a-c)

Trimethylsilyl-terminated poly(dimethylsiloxane-co-methylhydrosiloxane (19a-h) was separately dissolved in toluene (80 mL) before the addition of Karstedt's catalyst (180 μL). After 10 min of stirring, compound 8 was added to the reaction flask in a stoichiometric amount relative to the concentration of SiH groups. The reaction was heated to reflux and stirred overnight. Activated charcoal was added to the mixture after it had cooled to ambient temperature and the mixture continued to stir for an additional 5 h. The reaction was then filtered through a pad of Celite® using Büchner funnel to yield the isolated polymer following rotary evaporation.

$^1$H NMR (21a) (300 MHz, $CDCl_3$) δ=7.30 (s, 1H), 6.27 (s, 1H), 5.96 (d, J=2.5 Hz, 1H), 2.63-2.58 (t, J=7.5 Hz, 2H), 1.66-1.61 (t, J=7.2 Hz, 2H), 1.28 (m, 16H), 0.53-0.48 (m, 2H), 0.08 (s, 88H). $^{13}$C {$^1$H} NMR (101 MHz, $CDCl_3$) δ=140.55, 110.00, 104.47, 33.33, 29.68, 29.56, 29.40, 29.22, 28.04, 27.98, 22.96, 17.50, 1.77, 1.51, 1.03, 0.53, −0.47. $^{29}$Si {$^1$H} NMR (60 MHz, $CDCl_3$) δ=−21.95. IR: v=1257 $cm^{-1}$ (C—O).

$^1$H NMR (21b) (300 MHz, $CDCl_3$) δ=7.29 (s, 1H), 6.27 (s, 1H), 5.96 (d, J=2.5 Hz, 1H), 2.64-2.59 (t, J=7.5 Hz, 2H), 1.66-1.61 (t, J=7.2 Hz, 2H), 1.27 (m, 16H), 0.53-0.48 (m, 2H), 0.08 (s, 88H). $^{13}$C {$^1$H} NMR (101 MHz, $CDCl_3$) δ=140.58, 109.99, 104.47, 33.35, 29.68, 29.57, 29.40, 29.20, 28.05, 27.98, 22.96, 17.50, 1.77, 1.51, 1.03, 0.53, −0.48. $^{29}$Si {$^1$H} NMR (60 MHz, $CDCl_3$) δ=−21.95. IR: v=1257 $cm^{-1}$ (C—O).

$^1$H NMR (21c) (300 MHz, $CDCl_3$) δ=7.29 (s, 1H), 6.27 (s, 1H), 5.96 (d, J=2.5 Hz, 1H), 2.64-2.59 (t, J=7.5 Hz, 2H), 1.66-1.61 (t, J=7.2 Hz, 2H), 1.27 (m, 16H), 0.53-0.48 (m, 2H), 0.08 (s, 20H). $^{13}$C {$^1$H} NMR (101 MHz, $CDCl_3$) δ=140.58, 109.99, 104.47, 33.35, 29.68, 29.57, 29.40, 29.20, 28.05, 27.98, 22.96, 17.50, 1.77, 1.51, 1.03, 0.53, −0.48. $^{29}$Si {$^1$H} NMR (60 MHz, $CDCl_3$) δ=−21.95. IR: v=1258 $cm^{-1}$ (C—O).

Synthesis of the Elastomers

To synthesize the silicone elastomers in the mould, the diene and dienophile compounds were dissolved in chloroform and ultrasonicated for 30 min at 35° C., to produce a homogeneous mixture. After mixing, the solvent was removed under vacuo at ambient temperature and the reaction mixture was added to the mould and put into the oven for 24 h at 60° C.-70° C. in order to form the cross-linked elastomers. This method was applied to the synthesis of all of the elastomers except for the ones involving the tetramethybis[(N-maleimidomethyl)oxy]disiloxane 10 as the dienophile as these elastomers were formed at ambient temperature over 5 h.

Results and Discussion

Model compounds were synthesized in order to provide a basis for comparison with the more complex polymeric species that were the target of these experiments. The model compounds were utilized to not only provide a basis for spectroscopic characterization of the polymeric systems, but also to establish the optimal temperatures for Diels-Alder/retro-Diels-Alder reactions in terms of adduct yield.

A library of model compounds consisting of two different dienes (Scheme 1) and six different dienophiles (Scheme 2) was used to investigate Diels-Alder (DA) and retro Diels-Alder (rDA) reactions involving trisiloxane frameworks. Studies of these model systems were designed to establish optimal DA/rDa temperatures for the various compound pairings. Of the six different maleimide-based dienophiles (Scheme 2) that were utilized, five (11-15) were commercially available while the sixth (10) represented a novel compound synthesized (Scheme 3).

Scheme 1

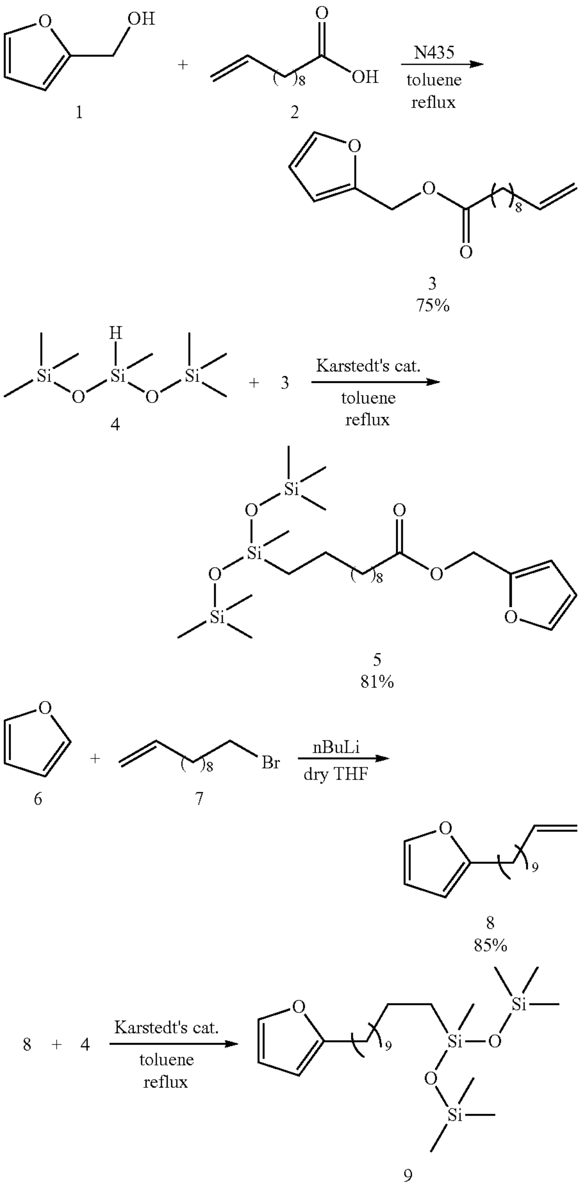

Scheme 2

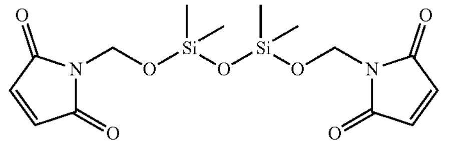

10

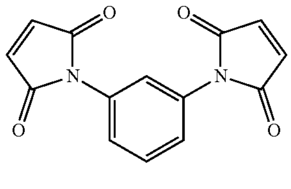

11

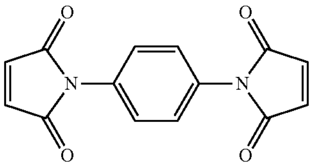

12

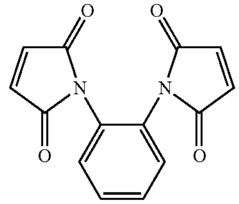

13

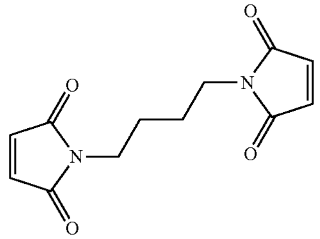

14

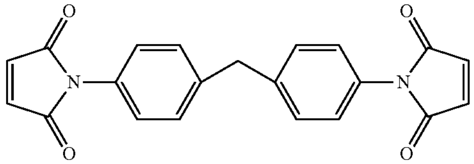

15

Scheme 3

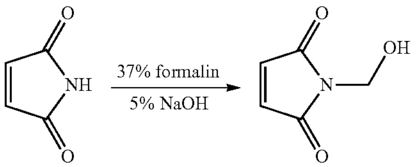

16

17
76%

17 +

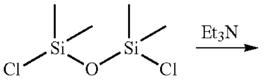

18

-continued

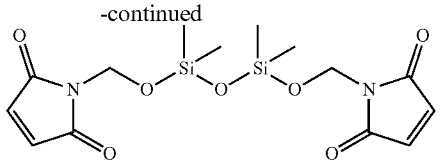

10
76%

The model furan-ester diene system 5 was synthesized using a chemoenzymatic approach (Scheme 1) with an enzyme-mediated esterification being followed by hydrosilylation to the diene onto the model siloxane structure in excellent yield. Conversely, the alkylfuran-diene 9 was afforded via nucleophilic substitution followed by hydrosilylation, also in excellent yield (Scheme 1).

Model Diels-Alder reactions were carried out using ester diene 5 and dienophiles 10-15 and aliphatic diene 9 and dienophiles 10-15. Diels-Alder reactions were carried out at 40° C., 50° C., 60° C., 70° C., and 80° C. in an effort establish the optimal reaction temperature(s). While most reactions required reaction temperatures in excess of 50° C. in order to maximize Diels-Alder adduct formation (optimal temperatures were between 65-70° C.), Diels-Alder reactions between 5 and 10 and 9 and 10 demonstrated high maleimide conversion at 40° C. Based on this result, the Diels-Alder reactions between 5 and 10, and 9 and 10 were attempted at ambient temperature. Under these conditions 80% of the maleimide species was consumed in only 5 h. This represents the first reported instance of a siloxane-based Diels-Alder reaction taking place at ambient temperature; none of the commercially available bismaleimide compounds underwent the Diels-Alder reaction with 5 or 9 at ambient temperature. Under these conditions, the endo isomer was the major product but the concentration of the exo isomer could be increased by increasing the reaction temperature and the reaction time. Conversion of the starting material and the endo/exo composition of the product were determined using $^{1}H$ NMR. Given that, the purpose of the Diels-Alder reaction was to form covalent bonds between, and thus crosslink, silicone polymers, the focus of this research was on the formation of a Diels-Alder adduct between polymer chains rather than optimizing the endo/exo ratios of the products.

In an effort to better understand the reaction between diene 5 and dienophile 10, variable temperature (VT) $^{1}H$ NMR experiments were undertaken (FIG. 1). Examination of the NMR spectra revealed that the resonance at 5.2 ppm (●) corresponding to the maleimide alkene protons disappeared as the temperature increased, signifying that the Diels-Alder reaction was taking place, and then reappeared once the temperature reached 85° C. indicating that the retro-Diels-Alder reaction was now the dominant pathway. The formation of the new endocyclic double bond formation (■) and endo/exo protons (*/▲) and their subsequent disappearance over the experimental temperature range can be observed. The retro-Diels-Alder reaction for adducts formed from 5 and 10, and 9 and 10 began at 70° C. and 60° C., respectively, and continued to completion at 85° C. (FIG. 1). These data suggested that 85° C. would be the ideal temperature for cleaving the Diels-Alder linkages in the target elastomers permitting the material to be recycled.

Figure 2:
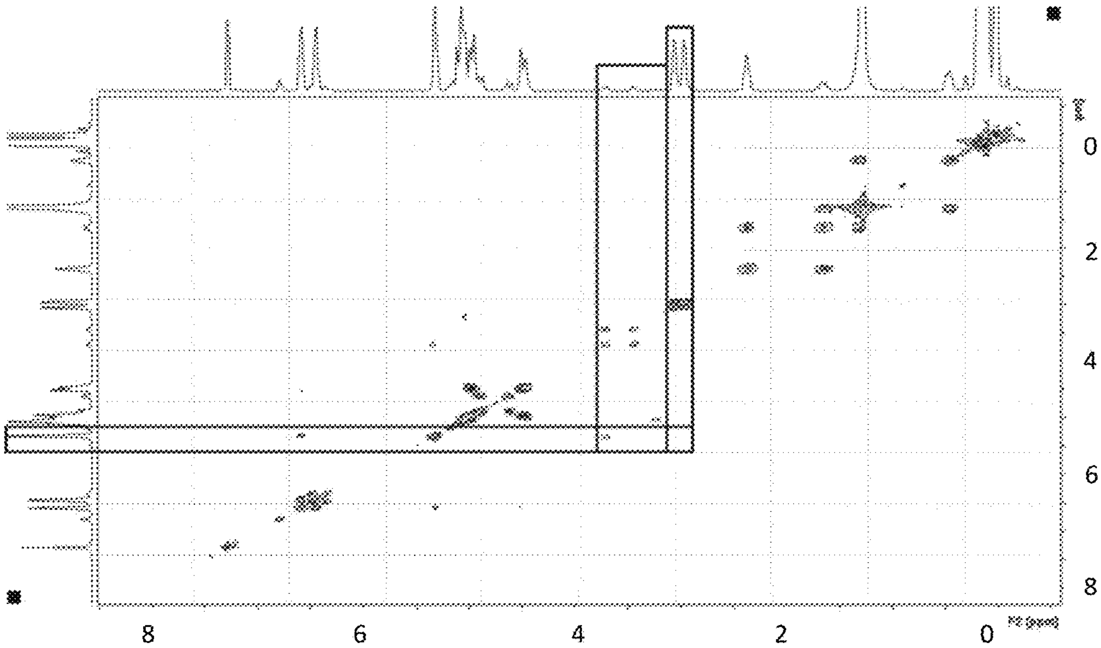
FIG. 2 shows gCOSY NMR spectra illustrating the correlation between the endo protons and the bridgehead proton, according to exemplary embodiments of the application.

The disappearance of bismaleimide alkene resonance at ~5.2 ppm in the $^{1}H$ NMR (FIG. 1) confirmed the consumption of the maleimide ring. Moreover, the two doublets corresponding to the alkene protons of the newly synthesized cyclohexene ring were observed at 6.41 and 6.44 ppm indicating the successful formation of the Diels-Alder adduct. The bridgehead proton of the adduct was assigned to the resonance at 5.35 ppm. The most shielded protons (0.41-0.46 ppm) were used as reference protons to calculate the exo and endo adducts ratios in the product. Furthermore, a gCOSY NMR spectrum (FIG. 2) was acquired to confirm that the resonances at 3.02-3.04 and 3.40-3.71 ppm corresponded to the exo and endo adducts, respectively. Owing to the ~90° dihedral angle between bridgehead proton and the exo proton, the correlation between these two protons was not observed in the gCOSY NMR spectrum. As a result, the protons were assigned as follows: 3.02 ppm (exo), 3.04 ppm (exo), 3.41 ppm (endo), and 3.69 ppm (endo).

Of the three commercially available aromatic bismaleimides (meta 11, para 12, ortho 13) examined, meta 11 compound proved to be most reactive in the model Diels-Alder reactions. The relatively low reactivity of ortho compound 13 was attributed to the steric hindrance of the two maleimide rings, which inhibited addition of a furan ring attached to a bulky siloxane chain.

Figure 3:
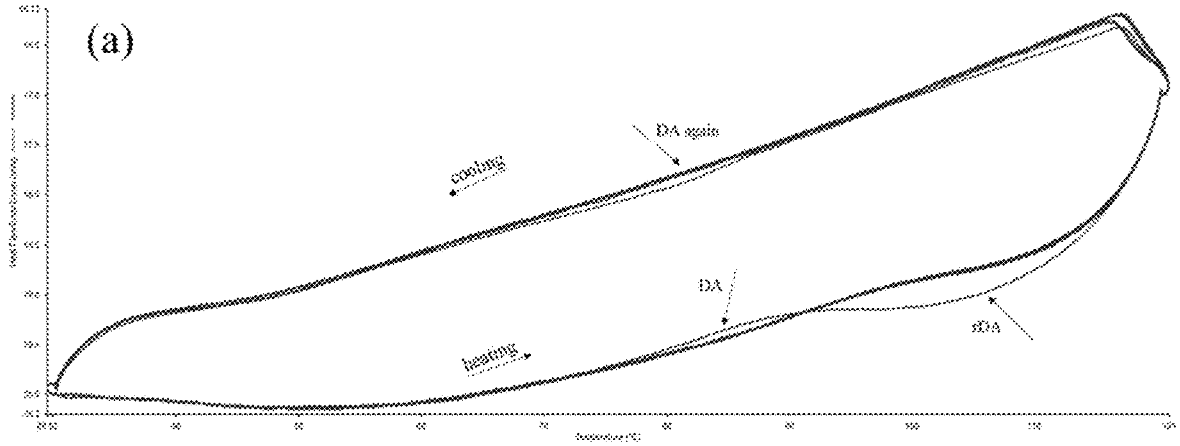
FIG. 3 shows DSC thermograms (7 cycles) of the Diels-Alder and retro-Diels-Alder reactions between 5 and 10, according to exemplary embodiments of the application.

Model systems were further subjected to differential scanning calorimetry (DSC) and thermogravimetric analysis (TGA) to study the DA/rDA equilibrium and the reversibility of the system. Diels-Alder samples were prepared from 1:1 mixtures, by mass, of the diene:dienophile of interest combined in a flask and stirred in the absence of solvent at 80° C. for 24 h to yield the DA adduct in approximately 85% yield. Then, three cycles of heating and cooling were applied to each sample from 30° C. to 120° C. with a ±4° C. heating/cooling rate and the DSC and TGA thermographs were collected. For example, the DSC trace for the reaction between 5 and 10 (FIG. 3) showed that for this model system the DA and rDA reactions occurred at approximately 55° C. and 105° C., respectively, higher than what was observed in the VT NMR experiments. The data indicated that the thermal properties of the model system remained stable over multiple iterations, suggesting that elastomers based on these model systems would have merit as a basis for recyclable silicone polymers. The TGA data indicated that the compounds did not demonstrate appreciable degradation as evidenced by minimal weight loss (from 1.75 mg to 1.63 mg depending on the sample) after being subjected to 7 heating and cooling cycles. The other model reactions displayed similar thermal behavior to the model reaction between 5 and 10.

Scheme 4

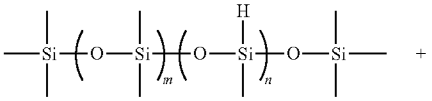

19a: 3-4% SiH, $M_n$ = 13,000 g/mo
19b: 7-9% SiH, $M_w$ = 5,500-6,500 g/mol
19c: 25-30% SiH, $M_w$ = 2,000-2,600 g/mol
19d: 4-6% SiH, $M_n$ = 20,000-25,000 g/mol
19e: 4-8% SiH, $M_n$ = 50,000-60,000 g/mol
19f: 6-7% SiH, $M_n$ = 1,900-2,000 g/mol
19g: 15-18% SiH, $M_n$ = 1,900-2,000 g/mol
19h: 50-55% SiH, $M_n$ = 900-1,200 g/mol

3

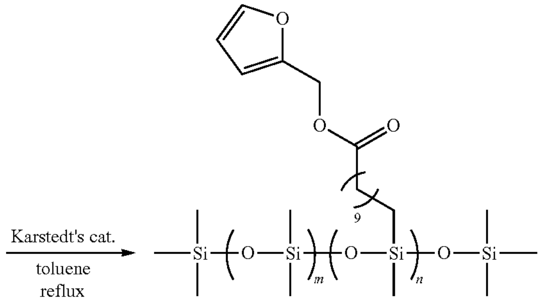

20a
20b
20c
20d
20e
20f
20g
20h

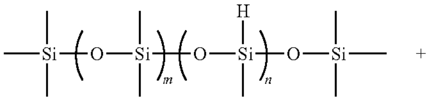

19a
19b
19c

8

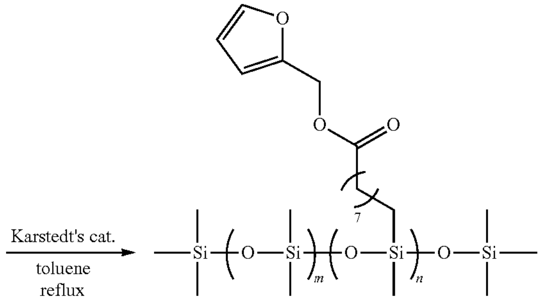

21a
21b
21c

Elastomer Synthesis

Figure 4:
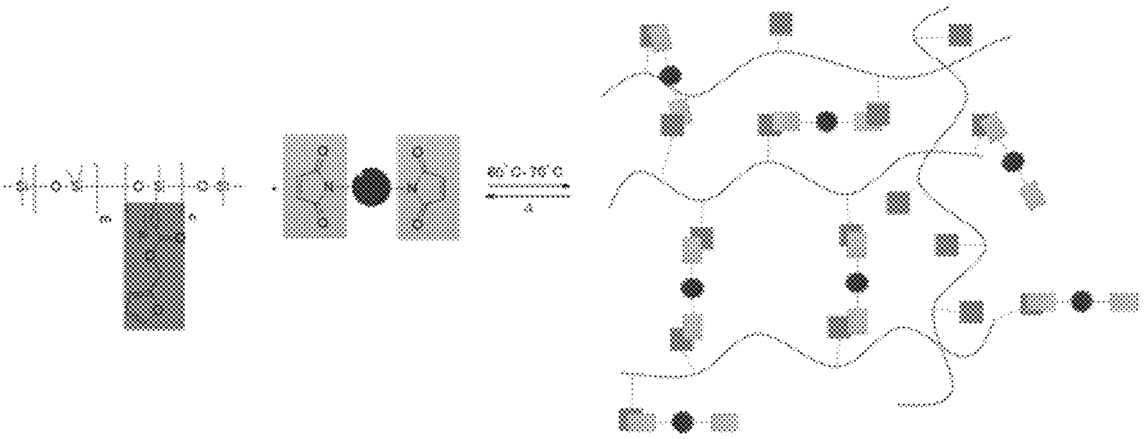
FIG. 4 shows a graphical representation of the Diels-Alder reactions between furan-modified silicones and bis-maleimides leading to elastomer formation, according to exemplary embodiments of the application.

The data obtained from the model studies was extended to the synthesis of elastomeric silicone materials cross-linked using the Diels-Alder reaction (FIG. 4). A series of siloxane polymers (20a-h and 21a-c) (Scheme 4) with varying concentrations of the furan diene along the polymer backbone were reacted with bismaleimide dienophiles 10-15 in an effort to form elastomers (22-27). All of the elastomers were formulated with a 1:1 mole ratio of diene:dienophile. The solvent-free Diels-Alder reaction was performed in a polytetrafluoroethylene (PTFE, Teflon™) mould (37.6 mm L×13.8 mm W×3 mm D) with three cavities.

Once the components of the reaction were placed in the mould, the entire system was placed in an oven and the elastomers were permitted to cure. It should be noted that 1,4-bis(maleimido)butane was only reacted with the 7-9% PDMS diene system as the cost of the bismaleimide was prohibitive.

A summary of the elastomer formulations can be found in Table 1. The boxes labelled with the superscript a represent elastomers that did not cure after 72 h at 70° C. The boxes labelled with the superscript b represent elastomers that cured but did not do so completely. These elastomers were tacky on their upper surface or very gelatinous in nature and could not be removed intact from the moulds. The boxes labelled with the superscript c represent perfectly formed elastomers, and the boxes labelled with the superscript d represent elastomers that were not attempted, in spite of the model system results, simply because the cost of the bismaleimide was prohibitive.

TABLE 1

Elastomer formulations.

| Polymeric Diene | Dienophile 10 | 11 | 12 | 13 | 14 | 15 |
|---|---|---|---|---|---|---|
| 20a | 22a$^b$ | 23a$^b$ | 24a$^a$ | 25a$^d$ | 26a$^d$ | 27a$^d$ |
| 20b | 22b$^c$ | 23b$^c$ | 24b$^a$ | 25b$^c$ | 26b$^c$ | 27b$^c$ |
| 20c | 22c$^c$ | 23c$^c$ | 24c$^a$ | 25c$^d$ | 26c$^d$ | 27c$^d$ |
| 20b | 22d$^c$ | 23d$^a$ | 24d$^a$ | 25d$^a$ | 26d$^d$ | 27d$^d$ |
| 20e | 22e$^c$ | 23e$^d$ | 24e$^a$ | 25e$^a$ | 26e$^d$ | 27e$^c$ |
| 20f | 22f$^a$ | 23f$^a$ | 24f$^a$ | 25f$^a$ | 26f$^d$ | 27f$^d$ |
| 20g | 22g$^c$ | 23g$^c$ | 24g$^a$ | 25g$^a$ | 26g$^d$ | 27g$^d$ |
| 20h | 22h$^c$ | 23h$^c$ | 24h$^a$ | 25h$^d$ | 26h$^d$ | 27h$^d$ |
| 21a | 22i$^a$ | 23i$^a$ | 24i$^a$ | 25i$^a$ | 26i$^d$ | 27i$^d$ |
| 21b | 22j$^c$ | 23j$^c$ | 24j$^a$ | 25j$^b$ | 26j$^b$ | 27j$^c$ |
| 21c | 22k$^c$ | 23k$^c$ | 24k$^a$ | 25k$^b$ | 26k$^d$ | 27k$^c$ |

$^a$= systems that did not cure;
$^b$= systems that did not cure completely;
$^c$= elastomers that cured and could be analyzed further;
$^d$= elastomers that were not attempted given the prohibitive cost of the dienophile The elastomers formulated using the 3-4 mol % furan polymers (22a-27a) (Mn=13,000 g/mol) did not readily form elastomers. Presumably the relatively dilute nature of the diene moieties was not conducive to elastomer formation. These samples remained liquid during the 72 h reaction period, although some solid was observed in the moulds for elastomers 22a and 23a as well as 25j-27j and 25k and 27k. It was anticipated that none of the Diels-Alder reactions that involved 12 as the dienophile would form elastomers based on the model studies and this was indeed the case (24a-24k).

All of the elastomers utilizing the commercially available dienophiles 11-15 were synthesized at temperatures ranging from 60° C. to 70° C. in an oven over the course of 24 to 48 h. These elastomers were similar in appearance to silicone elastomers formed using furans and maleimide species bonded to linear silicone polymers. However, silicone elastomers 22a-k utilizing bismaleimide 10 as the dienophile were fully formed at ambient temperature (21° C.) in only 5 h. The retro-Diels-Alder reaction for these elastomers occurred at 80° C., similar to the model systems, compared to the other elastomers 23-27 that typically saw the onset of the retro-Diels-Alder reaction at approximately 100° C. This is the first, and only, reported case of a self-healing silicone elastomer based on the Diels-Alder reaction where healing occurs at ambient temperature.

Solid-state $^1$H NMR analysis of the cross-linked PDMS elastomer 22k demonstrated exo and endo adduct resonances at 3.24 ppm and 3.37 ppm, respectively. Solid-state $^1$H NMR analysis of 22c demonstrated exo and endo adduct protons at 3.40 ppm and 3.68 ppm, respectively. This data was consistent with the $^1$H NMR spectra acquired for the model systems.

Imaging the Elastomers

Figure 5:
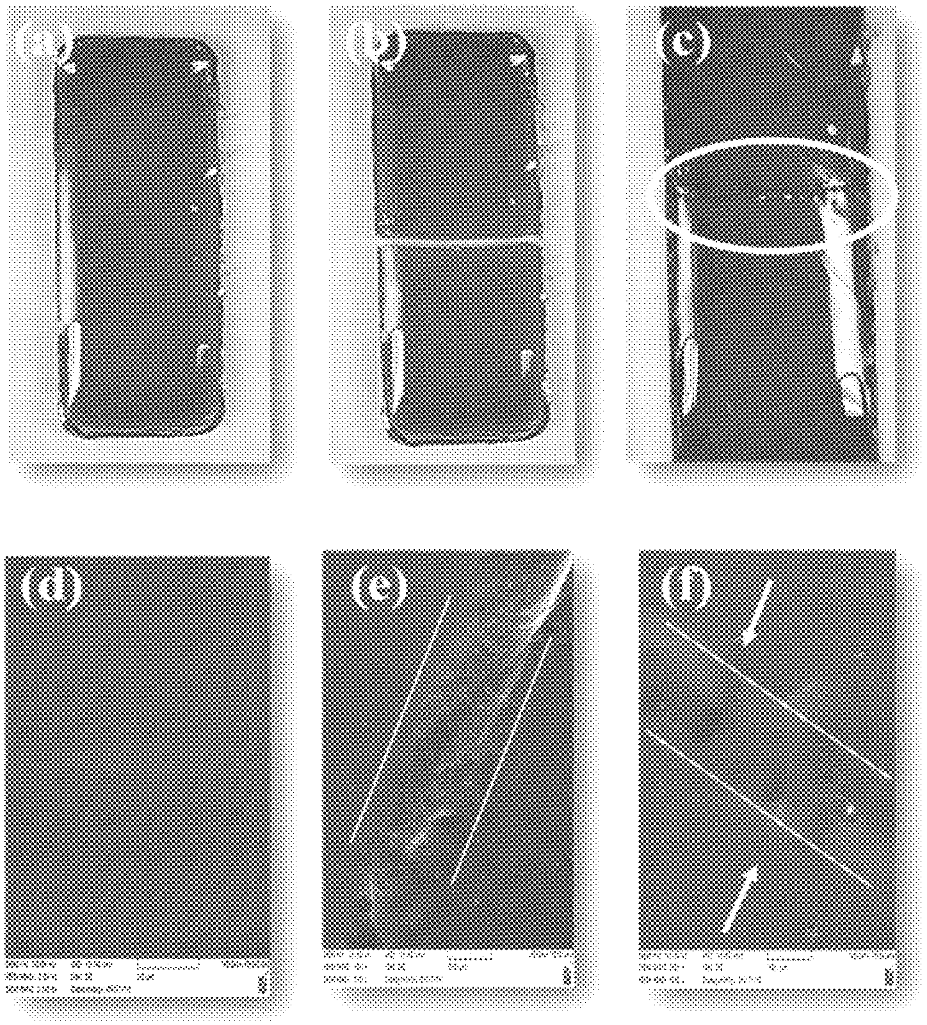
FIG. 5 shows optical microscopy images (a, b and c) and scanning electron microscopy (SEM) images (d, e and f) of a 23b virgin elastomer (a) & (d), bisected elastomer (b), and the "scar" of a healed elastomer (c), (e), & (f) obtained by heating the sample to 120° C., cooling and healing, according to exemplary embodiments of the application.

In addition to using solid state $^1$H NMR to confirm the self-healing and reversible nature of the Diels-Alder reactions in the silicone elastomers, optical and scanning electron microscopy (SEM) images were acquired to observe the surface of virgin and healed surfaces for elastomer 23b, chosen at random from all of synthesized elastomers involving the commercially available bismaleimides (FIG. 5). A faint scratch was visible on the surface of the elastomers after healing using microscopy. Even though a scar was visible on the surface of the elastomer, the silicone material was completely healed (i.e., one solid elastomer rather than two individual pieces). The elastomer was imaged at various magnifications to truly understand the implications of the healing process on the surface of the elastomeric material and the totality of the healing process.

Figure 6:
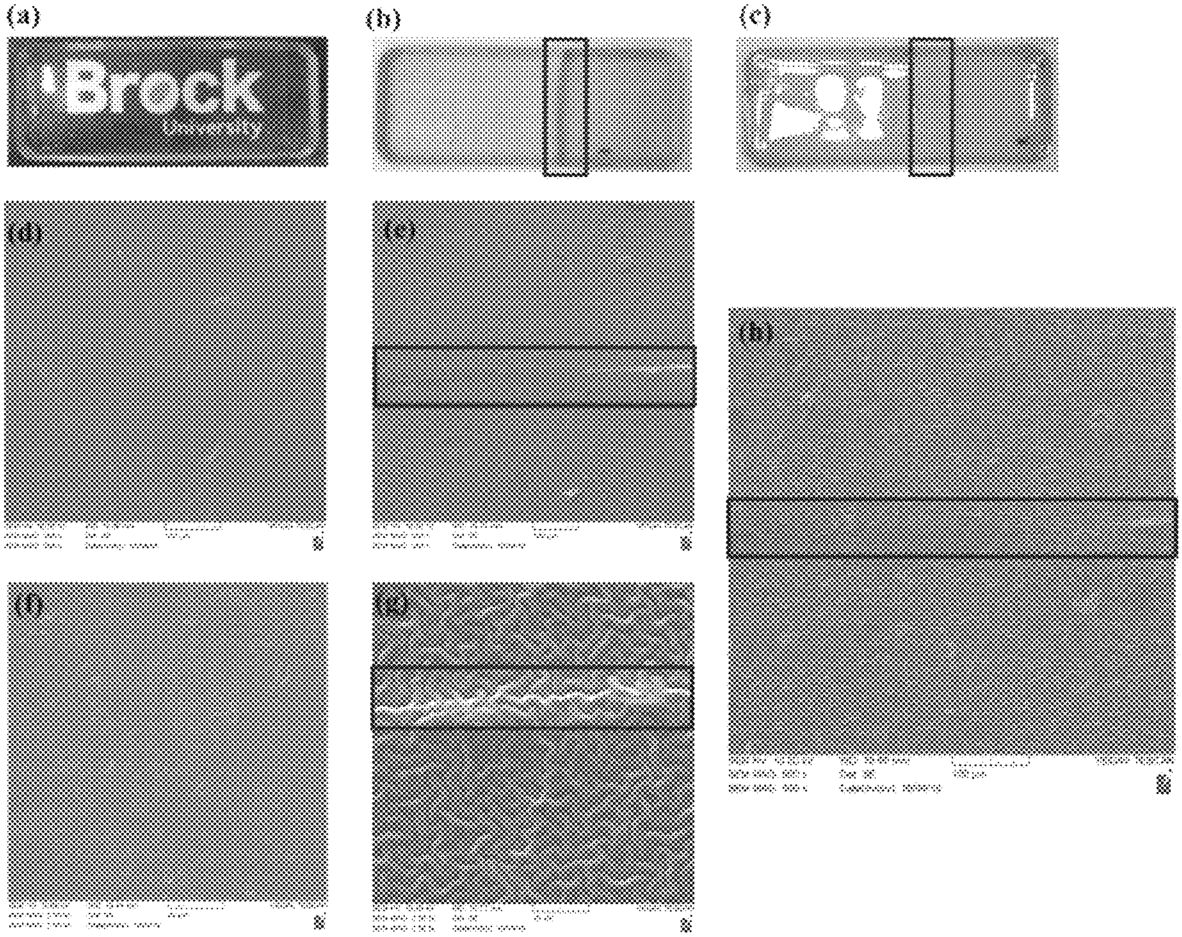
FIG. 6 shows photographs and SEM images for the elastomer made from 22b: (a), (b), (c) photographs of virgin, bisected, and healed elastomer respectively; (d), (e) SEM images of a virgin and healed elastomer at 200× magnification; (f), (g) the same virgin and healed elastomer imaged at 2.5 k× magnification; (h) the healed elastomer imaged at 500× magnification, with cuts/scars highlighted in (b), (c), (e), (g), and (h), according to exemplary embodiments of the application.

The elastomers made using the commercially available dienophiles (11-15) were all yellow or brown in color, similar to other systems reported in the literature. However, elastomers formulated using 10 as the dienophile were are all clear and colorless (FIG. 5). Scanning electron microscopy (SEM) imaging of the elastomer 22b (FIG. 6) revealed an extremely well healed elastomer—the scar was nearly imperceptible. These data suggested that silicone elastomers employing 10 as the cross-linker are more efficient not only in terms of their initial synthesis, but also with respect to their self-healing, which was observed to occur in 2-3 min after heating the sample to 80° C. to increase chain mobility within the elastomer. Healing was efficient not only with neatly bisected materials, but also with jagged, rough damage that was more representative of real-world scenarios.

Recycling the Elastomers

Figure 7:
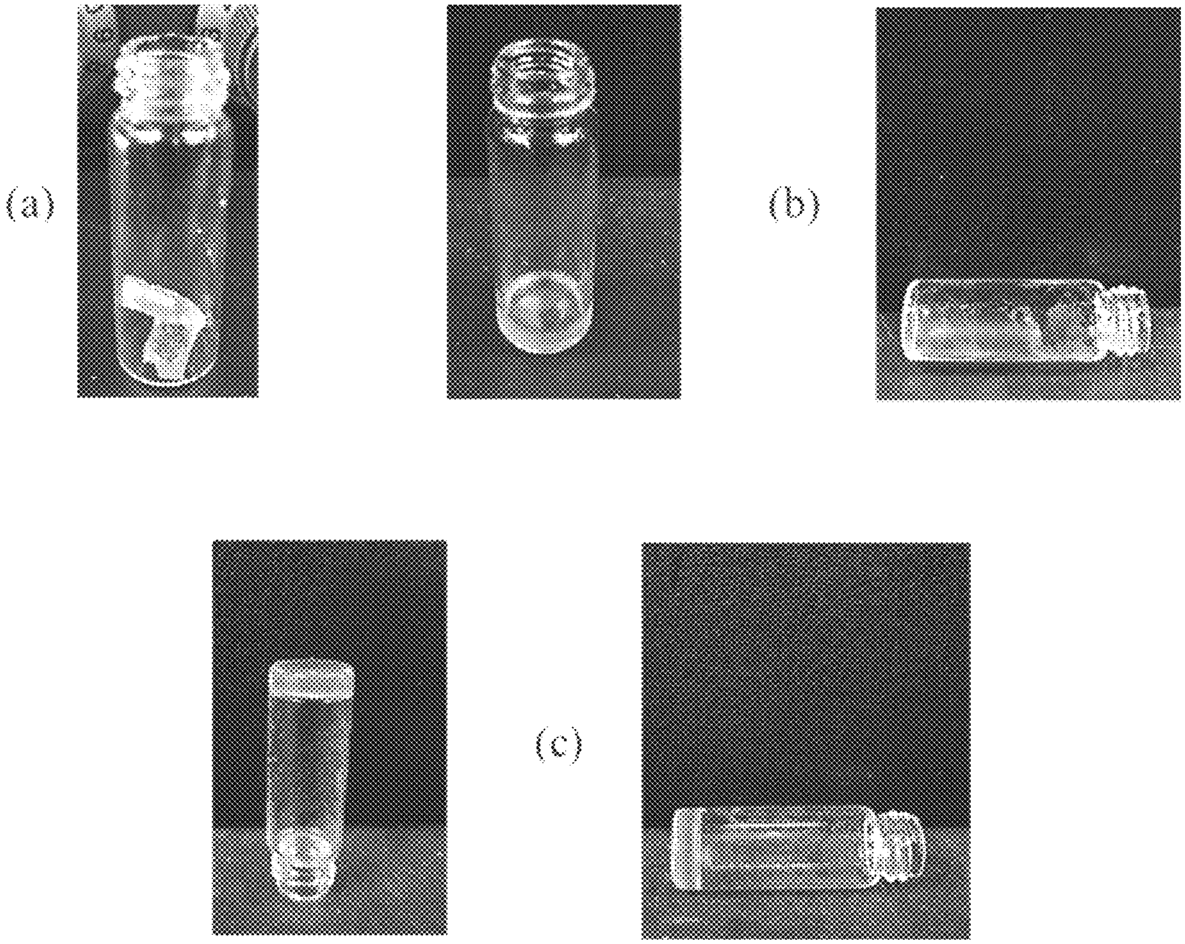
FIG. 7 shows the capacity of the elastomers made from 22b to be remoulded into different shapes and hence recycled, according to exemplary embodiments of the application.

One of the challenges facing our world is the abundance of polymer waste that is entering into landfills and into the environment. Although self-healing will prolong the useful lifetime of a polymer and mitigate this global problem somewhat, it is also of interest to develop silicone elastomers that could be readily recycled, something that has traditionally been difficult with these types of systems. The capacity of the silicone elastomers to be remoulded into different shapes was used as a surrogate by which to explore the recyclability of these silicone elastomers. As an example, a sample of the elastomer made from 22b was heated to 80° C. in a small vial. The solid sample underwent the retro-Diels-Alder reaction and became fluid in nature. After cooling and being left at the ambient temperature for a few hours the sample underwent the Diels-Alder reaction once again to form a solid elastomer, this time adopting the cylindrical shape of the vial (FIG. 7).

Tensile Strength Measurements

Elastomers 22a, 23a, 25j, 26j, 25k, and 27k were quite delicate and broke upon attempts to remove them from the moulds. As a result, it was not possible to obtain tensile strength measurements for these systems.

The tensile strength of the polysiloxane elastomers that were extracted from the moulds were examined, as was their capacity for elongation (Table 2). It was also of interest to compare the tensile strengths of the elastomers both before and after healing (Table 2).

TABLE 2

Strength and elongation measurements for select elastomers.

| | Virgin Elastomer | | Healed Elastomer | | | |
|---|---|---|---|---|---|---|
| Elastomer | Load (N) | Elongation ($cm^{-1}$) | Load (N) | Elongation ($cm^{-1}$) | % Change in Load | % Change in Elongation |
| 22b | 1.2 | 3.2 | 1.2 | 3.3 | 0 | 0 |
| 22c | 8.2 | 0.7 | 1.6 | 0.3 | −80 | −60 |
| 22d | 2.4 | 3.0 | 2.2 | 1.5 | −8 | −50 |
| 22e | 4 | 1.3 | 3.6 | 0.7 | −10 | −50 |
| 22g | 5.2 | 2.3 | 2.2 | 0.8 | −58 | −64 |
| 22h | 3.8 | 0.4 | 1.8 | 0.9 | −50 | 143 |
| 22j | 0.8 | 2.0 | — | — | — | — |
| 22k | 8.2 | 0.7 | — | — | — | — |
| 23b | 12.2 | 1.1 | — | — | — | — |
| 23j | 0.4 | 1.2 | — | — | — | — |
| 23k | 81.1 | 0.2 | — | — | — | — |
| 25b | 0.8 | 0.9 | — | — | — | — |
| 25c | 3.4 | 0.3 | — | — | — | — |
| 25h | 5.4 | 0.2 | 9.4 | 0.2 | 74 | 0 |
| 26b | 2.4 | 1.0 | — | — | — | — |
| 27b | 2.8 | 0.6 | — | — | — | — |
| 27c | 273.6 | 0.2 | — | — | — | — |
| 27e | 2.8 | 1.6 | 2.2 | 0.8 | −21 | −50 |
| 27g | 4.4 | 0.5 | 3.8 | 0.2 | −14 | −53 |
| 27h | 72.2 | 0.1 | 27.2 | 0.1 | −62 | 0 |
| 27j | 0.8 | 1.5 | — | — | — | — |

Although elastomers 23k, 27c, and 27h were able to withstand a relatively high level of applied force when compared to the other cross-linked systems, the materials showed very little elongation under the applied force, with 27c only stretching 2 mm before catastrophic failure of the sample was observed. This can be attributed to the high concentration of reactive diene sites along the polymer backbone and the relatively short polymer chains in the parent compound. The remaining elastomers were only able to sustain 12.2 N of force (23b) or less with elongation values ranging from 2 mm (23k) to 32 mm (22b). The elastomers formed using siloxane bismaleimide 10 demonstrated the greatest elongation, presumably as a result of the added flexibility of the siloxane moiety in the cross-linker.

It was of interest to examine the tensile properties of polymers both before and after healing. All of the elastomers became weaker after healing (i.e., were able to sustain a lower applied force) with the exception of 25h, which saw a 74% increase in the amount of applied force (5.4 N virgin vs. 9.4 N healed) before catastrophic failure in the material was observed. The healing process likely resulted in a greater degree of cross-linking, which accounts for the increase in the strength of the material and the negligible (0%) change in elongation. It should be noted that will all of the elastomers that were tested, catastrophic failure always occurred at points other than the scar from healing, even when the calipers were placed as close to the scar as possible. This suggested that in all cases the healed portion of the elastomer became more robust than the undamaged areas, which was consistent with earlier findings.

Elastomers 22b and 22c represent proxies for elastomers formed using 10. When compared to the virgin elastomer, healed elastomer 22c elongated less (—60%) and was able to sustain a diminished applied force (—80%) after being healed. The virgin elastomer 22c was already highly cross-linked and rigid and the healing process likely permitted the formation of additional cross-links, exacerbating these phenomena and resulting a brittle material. On the other hand, elastomer 22b demonstrated no change in its capacity to sustain an applied force (1.2 N) and elongation (33 mm) after healing. These data suggest that for the elastomers that healed at ambient temperature a 7-8% diene concentration along the siloxane backbone was optimal for maintaining the elastomer's physical properties after healing. This was likely the result of polymer chains becoming untangled during the healing process, making it easier for the polymer chains to move over one another. As with the other healed elastomer elastomers that were tested, catastrophic failure of healed elastomer 22b did not occur at the scar; failure was always observed within the virgin portion of the elastomer. The extreme elongation (+143%) observed with elastomer 22h, coupled with its substantial decrease in capacity to sustain an applied force likely occurred as the result of a decreased level of Diels-Alder cross-links after the healing process.

Thermal Analysis of the Elastomers

Figure 8:
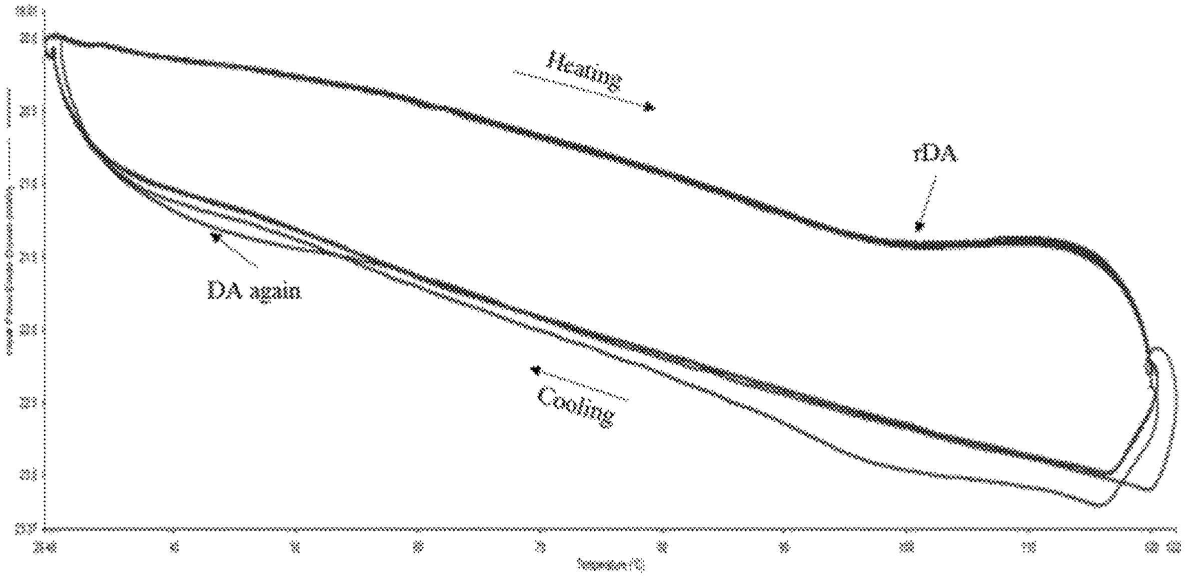
FIG. 8 shows DSC thermograms (7 cycles) of the Diels-Alder and retro-Diels-Alder reactions for elastomer 22b, according to exemplary embodiments of the application.

Thermal analyses of the elastomers were also performed, not only to verify the temperature at which the Diels-Alder and retro-Diels Alder reactions occurred, but also the stability of the elastomers over a series of heating and cooling cycles. A representative set of DSC traces for an elastomer (22b) is illustrated in FIG. 8. Seven cycles of heating and cooling were performed from 35° C. to 120° C. with a heating/cooling rate of ±4° C. and a holding time of 30 min after each increase in temperature. For all of the elastomers, the DSC data corroborated the Diels-Alder and retro-Diels-Alder temperatures observed via $^1$H NMR. Since the DSC instrument began recording data at 35° C., it should be noted that for the elastomers that cured at ambient temperature what was observed at 45° C. in the thermogram was the completion of the reaction not the start of the reaction (as corroborated by variable temperature NMR experiments), while the retro-Diels-Alder reaction was observed at 100° C., slightly higher than in the NMR experiments. TGA analyses revealed that no substantial thermal decomposition was observed for any of the elastomers. For example, a mass decrease of only 0.6 mg (17.3 mg to 16.7 mg) was observed for 22e.

Hardness Measurements

In this study, the hardness of the elastomers was measured both before damage and after healing (Table 3) using the Shore 00 scale. Not surprisingly, elastomers synthesized using silicone starting materials that had a higher Si—H concentration (25-30% Si—H), and hence more subsequent reaction points for crosslinking, saw a smaller change in their hardness values as a result of their higher crosslink density. Likewise, the elastomers were made from silicone starting materials that had an Si—H concentration of 7-9% were softer and more flexible owing to their lower crosslink densities. Although the majority of the elastomers became softer after a healing event, as corroborated by the tensile strength data, no trends were observed in terms of the hardness changes.

TABLE 3

Shore 00 measurements of select elastomers.

| Elastomer | Virgin Elastomer | Healed Elastomer | Change in Hardness |
|---|---|---|---|
| 22b | 66.0 | 60.2 | −5.8 |
| 22c | 68.3 | 56.7 | −11.6 |
| 22d | 64.1 | 48.7 | −15.4 |
| 22e | 65.3 | 46.0 | −19.3 |
| 22g | 58.7 | 47.2 | −11.5 |
| 22h | 70.1 | 63.4 | −7.3 |
| 22j | 34.0 | 29.1 | −4.9 |
| 22k | 78.3 | 74.0 | −4.3 |
| 23b | 62.4 | 58.7 | −3.7 |
| 23c | 82.4 | 77.2 | −5.2 |
| 23e | 63.9 | — | — |
| 23g | 53.7 | — | — |
| 23h | 69.1 | — | — |
| 23j | 32.0 | 28.0 | −4.0 |
| 23k | 70.0 | 66.1 | −3.9 |
| 25b | 45.8 | 36.0 | −9.8 |
| 25c | 76.2 | 60.0 | −16.2 |
| 25h | 85.0 | 64.2 | −20.8 |
| 26b | 39.1 | 31.3 | −7.8 |
| 27b | 54.8 | 47.4 | −7.4 |
| 27c | 64.4 | 58.0 | −6.4 |
| 27e | 70.5 | 72.4 | 1.9 |
| 27g | 81.4 | 72.8 | −8.6 |
| 27h | 67.9 | 64.4 | −3.6 |
| 27j | 40.0 | 36.7 | −3.3 |
| 27k | 66.9 | 60.9 | −6.7 |

Conclusions

A number of silicone elastomers capable of not only undergoing an efficient self-healing process, but also had the capacity to be recycled were synthesized. The results illustrated that the novel compound tetramethybis[(N-maleimidomethyl)oxy]disiloxane 10 had the highest maleimide conversion overall when subjected to the Diels-Alder reaction with furan-modified silicone polymers, and more importantly the elastomer cured at ambient temperature in only 5 h. This is the first, and only, reported case of a self-healing silicone elastomer based on the Diels-Alder reaction where healing occurs at ambient temperature. The scars that formed in the healed elastomers were more robust than the virgin material; tensile strength tests demonstrated that catastrophic failure always occurred at some point other than the healed site. After healing, all of the elastomers became softer as the polymer chains reorganized during the healing process. These elastomeric systems represent a promising modality for mitigating the impact of silicone polymers on the global waste stream.

While the present disclosure has been described with reference to what are presently considered to be the preferred examples, it is to be understood that the application is not limited to the examples described herein. To the contrary, the present disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

REFERENCES

1 D. K. Schneiderman and M. A. Hillmyer, Macromolecules, 2017, 50, 3733-3749.
2 J. Hopewell, R. Dvorak and E. Kosior, Philosophical Transactions of the Royal Society B: Biological Sciences, 2009, 364, 2115-2126.
3 I. L. Hia, V. Vahedi and P. Pasbakhsh, Polymer Reviews, 2016, 56, 225-261.
4 J. W. Nicholson, The Chemistry of Polymers, RSC Publishing, Cambridge, 4th Ed., 2012.
5 R. a Gross and B. Kalra, Science, 2002, 297, 803-807.
6 R. Dhanasekaran, S. Sreenatha Reddy and A. Sai Kumar, Materials Today: Proceedings, 2018, 5, 21373-21377.
7 Y. Hong and M. Su, ACS Applied Materials and Interfaces, 2012, 4, 3759-3764.
8 Y. Zhang, A. A. Broekhuis and F. Picchioni, Macromolecules, 2009, 42, 1906-1912.
9 S. D. Bergman and F. Wudl, Journal of Materials Chemistry, 2008, 18, 41-62.
10 G. Scheltjens, M. M. Diaz, J. Brancart, G. Van Assche and B. Van Mele, Reactive and Functional Polymers, 2013, 73, 413-420.
11 D. Y. Wu, S. Meure and D. Solomon, Progress in Polymer Science, 2008, 33, 479-522
12 R. P. Wool, Soft Matter, 2008, 4, 400-418.
13 Q. Shen, H. Liu, Y. Peng, J. Zheng and J. Wu, Polymer Chemistry, 2021, 12, 494-500.
14 Y. Zhang, E. Ren, A. Li, C. Cui, R. Guo, H. Tang, H. Xiao, M. Zhou, W. Qin, X. Wang and L. Liu, Journal of Materials Chemistry B, 2021, 9, 719-730.
15 S. Efstathiou, A. M. Wemyss, G. Patias, L. Al-Shok, M. Grypioti, D. Coursari, C. Ma, C. J. Atkins, A. Shegiwal, C. Wan and D. M. Haddleton, Journal of Materials Chemistry B, 2021, 9, 809-823.
16 X. Lei, Y. Huang, S. Liang, X. Zhao and L. Liu, Materials Letters, 2020, 268, 1-4.
17 H. Yan, S. Dai, Y. Chen, J. Ding and N. Yuan, ChemistrySelect, 2019, 4, 10719-10725.
18 D. P. Wang, Z. H. Zhao, C. H. Li and J. L. Zuo, Materials Chemistry Frontiers, 2019, 3, 1411-1421.
19 E. Ogliani, L. Yu, I. Javakhishvili and A. L. Skov, RSC Advances, 2018, 8, 8285-8291.
20 A. Strąkowska, A. Kosmalska, M. Masłowski, T. Szmechtyk, K. Strzelec and M. Zaborski, Polymer Bulletin, 2019, 76, 3387-3402.
21 R. Bui and M. A. Brook, Polymer, 2019, 160, 282-290.
22 P. Zheng and T. J. McCarthy, Journal of the American Chemical Society, 2012, 134, 2024-2027.
23 L. Zhao, X. Shi, Y. Yin, B. Jiang and Y. Huang, Composites Science and Technology, 2020, 186, 1-8.

24 J. Zhao, R. Xu, G. Luo, J. Wu and H. Xia, Journal of Materials Chemistry B, 2016, 4, 982-989.

25 S. Zheng, Y. Chen and M. A. Brook, Polymer Chemistry, 2020, 11, 7382-7392.

26 Z. Gou, Y. Zuo and S. Feng, RSC Advances, 2016, 6, 73140-73147.

27 A. Nasresfahani and P. M. Zelisko, Polymer Chemistry, 2017, 8, 2942-2952.

28 P. M. Zelisko and A. Nasresfahani, Self-Healing Siloxane Elastomers, U.S. Pat. No. 10,919,241, 2021.

29 Sandra Schafer Guido Kickelbick, Polymer, 2015, 69, 357-368.

30 R. Gheneim, C. Perez-Berumen and A. Gandini, Macromolecules, 2002, 35, 7246-7253.

31 H. Lei, S. Wang, D. J. Liaw, Y. Cheng, X. Yang, J. Tan, X. Chen, J. Gu and Y. Zhang, ACS Macro Letters, 2019, 8, 582-587.

32 L. M. Polgar, M. Van Duin, A. A. Broekhuis and F. Picchioni, Macromolecules, 2015, 48, 7096-7105.

33 D. Yu, X. Zhao, C. Zhou, C. Zhang and S. Zhao, Macromolecular Chemistry and Physics, 2017, 218, 1-6.

34 P. A. Pratama, M. Sharifi, A. M. Peterson and G. R. Palmese, ACS Applied Materials and Interfaces, 2013, 5, 12425-12431.

35 J. H. Small, D. A. Loy, D. R. Wheeler, J. R. McElhanon, R. S. Saunders, Method of Making Thermally Removable Polymeric Encapsulants, U.S. Pat. No. 6,271,335, 2001.

36 D. J. Julian, D. Katsoulis, B. A. Link, T. A. Peitz, B. Zhu, Method of Recycling Silicone Waste with the Use of Organic Polymer and Depolymerization Catalyst, WO 2014/130948 A1, 2014.

The invention claimed is:

1. A siloxane elastomer, comprising a) at least one siloxane polymer which is functionalized with at least one first Diels-Alder moiety, wherein the first Diels-Alder moiety comprises a diene; and b) a crosslinker having maleimide moieties and having the structure

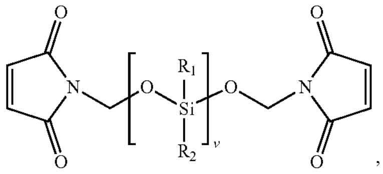

, wherein $R_1$ and $R_2$ are independently or simultaneously —($C_1$-$C_{10}$)-alkyl, —($C_2$-$C_{10}$)-alkenyl, —($C_2$-$C_{10}$)-alkynyl, or —($C_6$-$C_{10}$)-aryl;

v is an integer from 1 to 10; and wherein the first Diels-Alder moiety and the maleimide moieties form reversible crosslinks to form the siloxane elastomer, and wherein the first Diels-Alder moiety has the structure

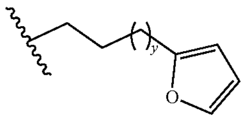

wherein y is an integer between 1 and 10, and

represents the connection to the siloxane.

2. The siloxane elastomer of claim 1, wherein the siloxane polymer has the structure

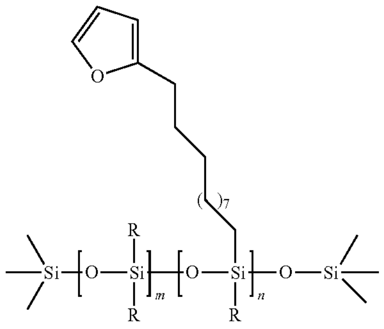

wherein m represents the molar ratio of the monomer and is between about 0.1 to about 20.0 mol %; and n represents the molar ratio of the monomer and is between about 80.0 to about 99.9 mol %.

3. The siloxane elastomer of claim 1, wherein v is 1, 2 or 3.

4. The siloxane elastomer of claim 1, wherein the crosslinker has the structure

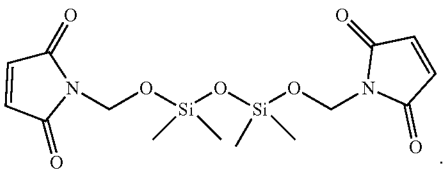 [SMILES: C[Si](C)(OCN1C(=O)C=CC1=O)O[Si](C)(C)OCN1C(=O)C=CC1=O]

.

5. The siloxane elastomer of claim 1, wherein the reversible crosslinks form at a temperature from about 20° C. to about 30° C.

6. The siloxane elastomer of claim 1, wherein $R_1$ and $R_2$ are independently or simultaneously —($C_1$-$C_6$)-alkyl.

7. The siloxane elastomer of claim 6, wherein $R_1$ and $R_2$ are $CH_3$.

8. The siloxane elastomer of claim 1, wherein the at least one siloxane polymer is a trimethylsilyl terminated copolymer comprising monomeric units of:

a) a first monomer which is a dimethylsiloxane;

b) a second monomer, which is formed from a methylhydrosiloxane, wherein the methylhydrosiloxane is functionalized with the at least one first Diels-Alder moiety.

9. The siloxane elastomer of claim 8, wherein the dimethylsiloxane has the structure

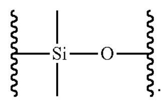 [SMILES: *O[Si](*)(C)C]

.

10. The siloxane elastomer of claim 8, wherein the methylhydrosiloxane has the structure

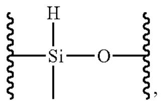

which is converted to a monomer having the structure

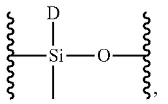

wherein D is a moiety containing the first Diels-Alder moiety.

11. The siloxane elastomer of claim 10, wherein the moiety D is

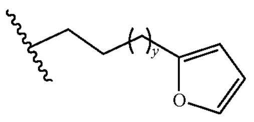

wherein y is an integer between 1 and 10, and

represents the connection to the siloxane.

12. The siloxane elastomer of claim 1, wherein the at least one siloxane polymer is a siloxane having the structure

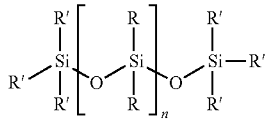

wherein each R is independently or simultaneously —($C_1$-$C_{10}$)-alkyl, —($C_2$-$C_{10}$)-alkenyl, —($C_2$-$C_{10}$)-alkynyl, or —($C_6$-$C_{10}$)-aryl;

each R' is a suitable terminal group, and n is an integer between 1 and 1,000, and wherein a portion of the R groups are replaced with a group comprising the first Diels-Alder moiety.

13. The siloxane elastomer of claim 12, wherein each R is independently or simultaneously is —($C_1$-$C_6$)-alkyl, —($C_2$-$C_6$)-alkenyl, —($C_2$-$C_6$)-alkynyl, or phenyl.

14. The siloxane elastomer of claim 13, wherein each R is methyl.

15. The siloxane elastomer of claim 14, wherein each R is methyl, and between 1% and 60% of the methyl groups are replaced with a group comprising the first Diels-Alder moiety.

16. The siloxane elastomer of claim 12, wherein R' is OH or —($C_1$-$C_6$)-alkyl.

17. The siloxane elastomer of claim 16, wherein R' is $CH_3$.

18. A siloxane elastomer, comprising a) at least one siloxane polymer having the structure

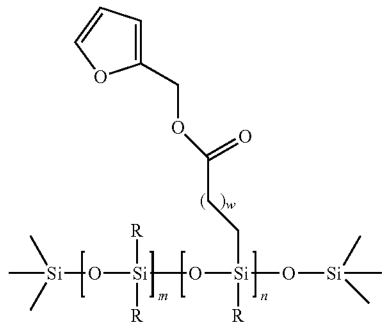

wherein w is an integer between 1 and 10;

m represents the molar ratio of the monomer and is between about 0.1 to about 20.0 mol %; and n represents the molar ratio of the monomer and is between about 80.0 to about 99.9 mol %, and each R is independently or simultaneously —($C_1$-$C_{10}$)-alkyl, —($C_2$-$C_{10}$)-alkenyl, —($C_2$-$C_{10}$)-alkynyl, or —($C_6$-$C_{10}$)-aryl; and b) a crosslinker having maleimide moieties and having the structure

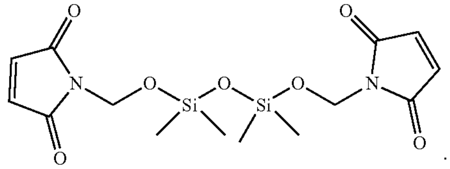 [SMILES: C[Si](C)(OCN1C(=O)C=CC1=O)O[Si](C)(C)OCN1C(=O)C=CC1=O]

.

* * * * *